US012157207B2

(12) United States Patent
Blum et al.

(10) Patent No.: US 12,157,207 B2
(45) Date of Patent: Dec. 3, 2024

(54) METHOD FOR OPERATING A HANDHELD POWER TOOL

(71) Applicant: Robert Bosch GmbH, Stuttgart (DE)

(72) Inventors: Jens Blum, Filderstadt (DE); Stefan Mock, Remshalden (DE); Florian Hoelscher, Stuttgart (DE); Dietmar Saur, Moessingen (DE); Simon Erbele, Nufringen (DE); Wolfgang Herberger, Stuttgart (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 17/631,245

(22) PCT Filed: Jul. 8, 2020

(86) PCT No.: PCT/EP2020/069289
§ 371 (c)(1),
(2) Date: Jan. 28, 2022

(87) PCT Pub. No.: WO2021/018538
PCT Pub. Date: Feb. 4, 2021

(65) Prior Publication Data

US 2022/0281082 A1 Sep. 8, 2022

(30) Foreign Application Priority Data

Jul. 30, 2019 (DE) ..................... 10 2019 211 305.2

(51) Int. Cl.
*B25B 21/02* (2006.01)
*B25B 23/14* (2006.01)
(Continued)

(52) U.S. Cl.
CPC .......... *B25B 21/02* (2013.01); *B25B 23/1405* (2013.01); *B25B 23/1475* (2013.01);
(Continued)

(58) Field of Classification Search
CPC ..... G05B 17/02; B25B 23/1475; B25B 21/02; B25B 23/1405; B25B 21/00;
(Continued)

(56) References Cited

U.S. PATENT DOCUMENTS

2004/0144552 A1 7/2004 Suzuki et al.
2007/0000676 A1 1/2007 Arimura
(Continued)

FOREIGN PATENT DOCUMENTS

CN 104227634 A 12/2014
DE 10 2013 212 506 A1 12/2014
(Continued)

OTHER PUBLICATIONS

International Search Report corresponding to PCT Application No. PCT/EP2020/069289, mailed Oct. 16, 2020 (German and English language document) (6 pages).

*Primary Examiner* — Veronica Martin
(74) *Attorney, Agent, or Firm* — Maginot, Moore & Beck LLP

(57) ABSTRACT

The disclosure relates to a method for operating a handheld power tool having an electric motor, the method comprising: S1 providing at least one model signal waveform that is associated with a work progress of the handheld power tool; S2 determining a signal of an operating variable of the electric motor; S3 comparing the signal of the operating variable with the model signal waveform and determining a conformity evaluation on the basis thereof; S4 identifying the work progress at least partially using the conformity evaluation; S5 executing a first routine of the handheld power tool at least partially on the basis of the work progress identified in method step S4. The disclosure also relates to a handheld power tool, in particular an impact driver, comprising an electric motor and a control unit, wherein the
(Continued)

control unit is designed to carry out a method according to the disclosure.

20 Claims, 15 Drawing Sheets

(51) Int. Cl.
*B25B 23/147* (2006.01)
*B25F 5/02* (2006.01)

(52) U.S. Cl.
CPC .......... *B25F 5/02* (2013.01); *B25D 2250/221* (2013.01); *B25D 2250/255* (2013.01)

(58) Field of Classification Search
CPC ................ B25B 21/026; B25B 21/008; B25B 23/1453; B25D 16/006; B25D 2250/201; B25D 2250/221; B25D 11/005; B25D 2250/095; B25D 2250/131
See application file for complete search history.

(56) References Cited

U.S. PATENT DOCUMENTS

| | | | | |
|---|---|---|---|---|
| 2013/0331994 | A1 | 12/2013 | Ng et al. | |
| 2016/0121467 | A1 | 5/2016 | Ng et al. | |
| 2017/0217001 | A1 * | 8/2017 | Oishi | B25B 21/02 |
| 2018/0290270 | A1 * | 10/2018 | Manasseh | H02P 6/32 |
| 2020/0246954 | A1 * | 8/2020 | Yamada | B25D 17/11 |

FOREIGN PATENT DOCUMENTS

| | | | |
|---|---|---|---|
| DE | 10 2015 001 982 | A1 | 8/2015 |
| DE | 10 2015 009 395 | A1 | 1/2017 |
| DE | 20 2017 003 590 | U1 | 8/2017 |
| DE | 10 2016 212 520 | A1 | 1/2018 |
| EP | 3 381 615 | A1 | 10/2018 |
| JP | 2001-353672 | A | 12/2001 |
| JP | 2015-150671 | A | 8/2015 |
| WO | 2016/067809 | A1 | 5/2016 |

* cited by examiner f(x)
x
310
200
322
324
900
902 q(x)
x
202
SP
201 f(x)
200

$\chi_1(x)$
203 (a)
203
$SP_2$
t2

$\chi_2(x)$
204 (a)
204
$SP_3$
t3

METHOD FOR OPERATING A HANDHELD POWER TOOL

This application is a 35 U.S.C. § 371 National Stage Application of PCT/EP2020/069289, filed on Jul. 8, 2020, which claims the benefit of priority to Serial No. DE 10 2019 211 305.2, filed on Jul. 30, 2019 in Germany, the disclosures of which are incorporated herein by reference in their entirety.

The disclosure relates to a method for operating a handheld power tool, and to a handheld power tool designed to execute the method. In particular, the present disclosure relates to a method for screwing in or unscrewing a threaded means using a handheld power tool.

BACKGROUND

Rotary impact drivers for tightening screw elements, for example threaded nuts and screws, are known from the prior art; see for example EP 3 381 615 A1. A rotary impact driver of this type comprises for example a structure in which an impact force is transmitted to a screw element in a direction of rotation by a rotary impact force of a hammer. The rotary impact driver which has this structure comprises a motor, a hammer to be driven by the motor, an anvil, which is struck by the hammer, and a tool. In the rotary impact driver, the motor installed in a housing is driven, wherein the hammer is driven by the motor, the anvil is in turn struck by the rotating hammer, and an impact force is emitted to the tool, wherein two different operating states, namely "no impact operation" and "impact operation", can be distinguished.

DE 20 2017 003 590 also discloses an electrically driven tool having an impact mechanism, wherein the hammer is driven by the motor.

When using rotary impact drivers, a user needs to pay close attention to the work status in order to react appropriately to a change in particular machine characteristics, for example the starting or stopping of toe impact mechanism, for instance to stop the electric motor and/or to change the speed via a manual switch. Since the user often cannot react quickly enough or appropriately to a work status, it is possible, when using rotary impact drivers for screwing-in operations, for screws to be overtightened, for example, and, for unscrewing operations, for screws to drop down if they are unscrewed too fast.

It is therefore generally desired for operation to be automated further and for the user to be unburdened by appropriate reactions or routines, initiated by the machine, of the device, and thus to achieve reliably reproducible, high-quality screwing-in and unscrewing operations. Examples of such reactions or routines initiated by the machine comprise for instance switching off the motor, changing the motor speed, or sending a notification to the user.

Such smart tool functions can be provided, inter alia, by identification of the current operating state. This is identified in the prior art, independently of the determination of a work status or the status of an application, for example by monitoring the operating variables of the electric motor, for instance the speed and electric motor current. Here, the operating variables are investigated to determine whether particular limit values and/or threshold values have been reached. Corresponding evaluation methods work with absolute threshold values and/or signal gradients.

A drawback here is that a fixed limit value and/or threshold value can be perfectly set in practice only for one application. As soon as the application changes, the associated current and speed values and the temporal progressions thereof change, and impact ascertainment on the basis of the set limit value and/or threshold value and the temporal progressions thereof no longer functions.

Thus, it is possible for, for example, an automatic switch-off, based on the ascertainment of impact operation, to switch off reliably in different speed ranges in some applications when self-tapping screws are used, but for no switch-off to occur in other applications when self-tapping screws are used.

In other methods for determining operating modes in rotary impact drivers, additional sensors, for instance acceleration sensors, are used in order to infer the current operating mode from vibrational states of the tool.

Drawbacks of these methods are additional costs for the sensors and losses in the robustness of the handheld power tool since the number of installed components and electrical connections increases compared with handheld power tools without these sensors.

Furthermore, simply having information as to whether the impact mechanism is working or not is often insufficient in order for it to be possible to draw accurate conclusions about the work status. Thus, for example, when screwing in particular wood screws, the rotary impact mechanism already starts very early, while the screw has not yet been fully screwed into the material, but the demanded torque is already exceeding what is known as the disengagement torque of the rotary impact mechanism. A reaction purely on the basis of the operating state (impact operation and no impact operation) of the rotary impact mechanism is therefore insufficient for a correct automatic system function of the tool, for example switching off.

In principle, the problem exists of largely automating operation in other handheld power tools, too, for instance impact drills, and so the disclosure is not limited to rotary impact drivers.

SUMMARY

The object of the disclosure is to specify an improved method, compared with the prior art, for operating a handheld power tool, said method at least partially eliminating the abovementioned drawbacks, or at least to specify an alternative to the prior art. A further object is to specify a corresponding handheld power tool.

These objects are achieved by means of the respective subjects of the disclosure. Advantageous configurations of the disclosure are the subject of respective embodiments.

According to the disclosure, a method for operating a handheld power tool is disclosed, wherein the handheld power tool has an electric motor. Here, the method comprises the steps of:

S1 providing at least one model signal shape, wherein the model signal shape is able to be associated with a work status of the handheld power tool;

S2 determining a signal of an operating variable of the electric motor;

S3 comparing the signal of the operating variable with the model signal shape and determining a match rating from the comparison;

S4 ascertaining the work status at least partially on the basis of the match rating determined in method step S3;

S5 executing a first routine of the handheld power tool at least partially on the basis of the work status ascertained in method step S4.

By way of the method according to the disclosure, a user of the handheld power tool is assisted effectively in achieving reproducible high-quality application results. In particular, by way of the method according to the disclosure, it is possible for a user more easily and/or quickly to achieve a fully completed work status.

In this case, the impact driver reacts in some embodiments to ascertainment of the impact state and the work status with the aid of the detection of characteristic signal shapes.

As a result of different routines, it is possible to provide the user with one or more system functionalities with which they can complete applications more quickly and/or easily.

A number of embodiments of the disclosure can be categorized as follows:

1. Embodiments which comprise routines or reactions to "just" impact ascertainment;
2. Embodiments which comprise routines or reactions to no-impact ascertainment;
3. Embodiments which comprise routines or reactions to work status (impact evaluation/impact quality); and All embodiments have the fundamental advantage that it is possible to conclude applications as quickly and fully as possible, this resulting in a reduced workload for the user.

A person skilled in the art will recognize that the feature of the model signal shape includes a signal shape of continuous progress of a work operation. In one embodiment, the model signal shape is a state-typical model signal shape, which is state-typical for a particular work status of the handheld power tool, for example the contact of a screw head with a fastening substrate, or the free rotation of a loosened screw.

The approach for ascertaining the work status via operating variables in the tool-internal measurement variables, for example the speed of the electric motor, proves to be particularly advantageous since, with this method, the work status takes place particularly reliably and largely independently of the general operating state of the tool or the application thereof.

In this case, the use of, in particular additional, sensor units for capturing the tool-internal measurement variables, for example an acceleration sensor unit, is substantially dispensed with, and so essentially only the method according to the disclosure serves for ascertaining the work status.

In one embodiment, the first routine comprises stopping the electric motor taking into consideration at least one defined and/or presettable parameter, in particular a parameter that is presettable by a user of the handheld power tool. Examples of such a parameter include a period of time, a number of revolutions of the electric motor, a number of revolutions of the tool receptacle, a rotational angle of the electric motor, and a number of impacts of the impact mechanism of the handheld power tool.

In a further embodiment, the first routine comprises changing, in particular reducing and/or increasing, a speed of the electric motor. Such a change in the speed of the electric motor may be achieved for example by means of a change in the motor current, the motor voltage, the battery current, or the battery voltage, or by a combination of these measures.

Preferably, an amplitude of the change in the speed of the electric motor is definable by a user of the handheld power tool. Alternatively or additionally, the change in the speed of the electric motor may also be specified by a target value. The term. "amplitude" should in this connection also be understood generally as meaning a level of the change and not be associated only with cyclical processes.

In one embodiment, the change in the speed of the electric motor takes place multiply and/or dynamically, in particular successively in time and/or along a characteristic curve of the change in speed and/or on the basis of the work status of the handheld power tool.

Preferably, a work status of the first routine is output to a user of the handheld power tool using an output device of the handheld power tool. Output by means of the output device can be understood as meaning in particular the display or documentation of the work status. Here, documentation can also be the evaluation and/or saving of work statuses. This comprises for example the saving of multiple screwdriving operations also in a memory.

In one embodiment, the first routine and/or characteristic parameters of the first routine are settable and/or presentable by a user via an application program ("app") or a user interface ("Human-Machine Interface", "HMI").

Furthermore, in one embodiment, the HMI may be arranged on the machine itself, while in other embodiments, the HMI may be arranged on external devices, for example a smartphone, a tablet or a computer.

In one embodiment of the disclosure, the first routine comprises visual, audible and/or haptic feedback to a user.

Preferably, the model signal shape is a waveform, for instance a waveform about a mean value, in particular a substantially trigonometric waveform. In this case, the model signal shape may represent for example ideal impact operation of the hammer on the anvil of the rotary impact mechanism, wherein the ideal impact operation is preferably an impact without onward rotation of the tool spindle of the handheld power tool.

In principle, suitable operating variables which are captured via a suitable measuring transducer may be different operating variables. In this case, it is advantageous that, according to the disclosure, an additional sensor is not necessary in this regard since various sensors, for example for monitoring the speed, preferably Hall sensors, are already installed in electric motors.

Advantageously, the operating variable is a speed of the electric motor or an operating variable that correlates with the speed. The fixed transmission ratio of electric motor to impact mechanism results for example in direct dependence of the motor speed on the impact frequency. A further conceivable operating variable that correlates with the speed is the motor current. Also conceivable as operating variables of the electric motor are a motor voltage, a Hall signal of the motor, a battery current or a battery voltage, wherein an acceleration of the electric motor, an acceleration of a tool receptacle or a sound signal of an impact mechanism of the handheld power tool is also conceivable as the operating variable.

In one embodiment of the disclosure, in method step S3, the signal of the operating variable is compared by means of a comparison method to determine whether at least one predefined threshold value of the match has been fulfilled.

Preferably, the comparison method comprises at least a frequency-based comparison method and/or a comparative comparison method.

In this case, the decision can be taken, at least partially by means of the frequency-based comparative method, in particular bandpass filtering and/or a frequency analysis, as to whether a work status to be ascertained has been identified in the signal of the operating variable.

In one embodiment, the frequency-based comparative method comprises at least the bandpass filtering and/or the frequency analysis, wherein the predefined threshold value amounts to at least 90%, in particular 95%, very particularly 98%, of a predefined limit value.

In the bandpass filtering, for example the picked up signal of the operating variable is filtered via a bandpass, the pass band of which matches the model signal shape. A corresponding amplitude in the resulting signal should be expected when the relevant work status to be ascertained is present, in particular in the ideal impact without onward rotation of the struck element. The predefined threshold value of the bandpass filtering can therefore at least 90%, in particular 95%, very particularly 98%, of the corresponding amplitude in the work status to be ascertained, in particular the ideal impact without onward rotation of the struck element. The predefined limit value can in this case be the corresponding amplitude in the resulting signal of an ideal work status to be ascertained, in particular an ideal impact without onward rotation of the struck element.

As a result of the known frequency-based comparative method of the frequency analysis, the previously defined model signal shape, for example a frequency spectrum of the work status to be ascertained, in particular an ideal impact without onward rotation of the struck element, can be looked for in the picked up signals of the operating variable. A corresponding amplitude of the work status to be ascertained, in particular the ideal impact without onward rotation of the struck element, should be expected in the picked up signals of the operating variable. The predefined threshold value of the frequency analysis can be at least 90%, in particular 95%, very particularly 98%, of the corresponding amplitude in the work status to be ascertained, in particular the ideal impact without onward rotation of the struck element. The predefined limit value can in this case be the corresponding amplitude in the picked up signals of an ideal work status to be ascertained, in particular the ideal impact without onward rotation of the struck element. In this case, appropriate segmentation of the picked up signal of the operating variable may be necessary.

In embodiment, the comparative comparison method comprises at least one parameter estimate and/or a cross-correlation, wherein the predefined threshold value amounts to at least 40% of a match of the signal of the operating variable with the model signal shape.

The measured signal of the operating variable can be compared with the model signal shape by means of the comparative comparison method. The measured signal of the operating variable is determined in such a way that it has substantially the same finite signal length as that of the model signal shape. The comparison of the model signal shape with the measured signal of the operating variable can in this case be output as an, in particular discrete or continuous, signal of finite length. Depending on a degree of matching or a deviation of the comparison, a result can be output as to whether the work status to be ascertained, in particular the ideal impact without onward rotation of the struck element, exists. If the measured signal of the operating variable matches the model signal shape at least to an extent of 40%, the work status to be ascertained, in particular the ideal impact without onward rotation of the struck element, may exist. In addition, it is conceivable for the comparative method, by means of the comparison of the measured signal of the operating variable with the model signal shape, to be able to output a degree of a comparison with one another as the result of the comparison. In this case, the comparison of at least 60% to one another can be a criterion for the existence of the work status to be ascertained, in particular the ideal impact without onward rotation of the struck element. Here, it should be assumed that the lower limit for the match lies at 40% and the upper limit for the match lies at 90%. Accordingly, the upper limit for the deviation lies at 60% and the lower limit for the deviation lies at 10%.

In the parameter estimation, a comparison between the previously defined model signal shape and the signal of the operating variable can easily take place. To this end, estimated parameters of the model signal shape can be identified in order to adapt the model signal shape to the measured signal of the operating variables. By means of a comparison between the estimated parameters of the previously defined model signal shape and a limit value, a result relating to the existence of the work status to be ascertained, in particular the ideal impact without onward rotation of the struck element, can be determined. Subsequently, a further evaluation of the result of the comparison can take place as to whether the predefined threshold value has been reached. This evaluation can be either a quality assessment of the estimated parameters or the match between the defined model signal shape and the captured signal of the operating variable.

In a further embodiment, method step S3 contains a step S3*a* of assessing the quality of the identification of the model signal shape in the signal of the operating variable, wherein, in method step S4, the work status is ascertained at least partially on the basis of the quality assessment. An adaptation quality of the estimated parameters can be determined as a measure of the quality assessment.

In method step S4, a decision can be taken, at least partially by means of the quality assessment, in particular the measure of the quality, as to whether the work status to be ascertained has been identified in the signal of the operating variable.

In addition or as an alternative to the quality assessment, method step S3*a* can comprise a match assessment of the identification of the model signal shape and the signal of the operating variable. The matching of the estimated parameters of the model signal shape with the measured signal of the operating variable can amount to for example 70%, in particular 60%, very particularly 50%. In method step S4, the decision is taken as to whether the work status to be ascertained exists, at least partially on the basis of the match assessment. The decision on the existence of the work status to be ascertained can take place at the predefined threshold value of at least 40% matching of the measured signal of the operating variable and the model signal shape.

In the case of a cross-correlation, a comparison between the previously defined model signal shape and the measured signal of the operating variable can take place. In the cross-correlation, the previously defined model signal shape can be correlated with the measured signal of the operating variable. In the case of a correlation of the model signal shape with the measured signal of the operating variable, a measure of the match between the two signals can be determined. The measure of the match can amount to for example 40%, in particular 50%, very particularly 60%.

In method step S4 of the method according to the disclosure, the ascertainment of the work status can take place at least partially on the basis of the cross-correlation of the model signal shape with the measured signal of the operating variable. The ascertainment can in this case take place at least partially on the basis of the predefined threshold value of at least 40% matching of the measured signal of the operating variable and the model signal shape.

In one embodiment, the threshold value of the match is settable by a user of the handheld power tool and/or predefined at the factory.

In a further embodiment, the handheld power tool is an impact driver, in particular a rotary impact driver, and the work status is starting or stopping of impact operation, in particular rotary impact operation.

In one embodiment, the threshold value of the match is selectable by a user on the basis of a preselection, predefined at the factory, of applications of the handheld power tool. This can take place for example via a user interface, for instance an HMI (Human-Machine Interface), for instance a mobile device, in particular a smartphone and/or a tablet.

In particular, in method step S1, the model signal shape may be set to be variable, in particular by a user. Here, the model signal shape is associated with the work status to be ascertained, such that the user can specify the work status to be ascertained.

Advantageously, the model signal shape is predefined in method step S1, in particular set at the factory. In principle, it is conceivable for the model signal shape to be stored or saved inside the device, alternatively and/or additionally provided to the handheld power tool, in particular provided by an external data device.

In a further embodiment, the signal of the operating variable is captured in method step S2 as a time series of measured values of the operating variable, or as measured values of the operating value as a variable of the electric motor that correlates with the time series, for example an acceleration, a jerk, in particular a higher order jerk, an output, an energy, a rotational angle of the electric motor, a rotational angle of the tool receptacle or a frequency.

In the last-mentioned embodiment, it is possible to ensure that a constant periodicity of the signal to be investigated is achieved regardless of the motor speed.

If the signal of the operating variable is captured in method step S2 as a time series of measured values of the operating variable, then, in a method step S2*a* following the method step S2, on the basis of a fixed transmission ratio of the transmission, the time series of the measured values of the operating variable is transformed into a series of the measured values of the operating variable as a variable of the electric motor that correlates with the time series. This again results in the same advantages as when the signal of the operating variable is captured directly over time.

The method according to the disclosure thus allows the work status to be ascertained independently of at least one setpoint speed of the electric motor, at least of a start-up characteristic of the electric motor and/or at least of a state of charge of the energy supply, in particular of a rechargeable battery, of the handheld power tool.

The signal of the operating variable should be understood here as being a temporal sequence of measured values. Alternatively and/or additionally, the signal of the operating variable can also be a frequency spectrum. Alternatively and/or additionally, the signal of the operating variable can also be post-processed, for example smoothed, filtered, fitted and the like.

In a further embodiment, the signal of the operating variable is stored as a series of measured values in a memory, preferably a ring memory, in particular of the handheld power tool.

In one method step, the work status to be ascertained is identified on the basis of fewer than ten impacts of an impact mechanism of the handheld power tool, in particular fewer than ten impact vibration periods of the electric motor, preferably fewer than six impacts of an impact mechanism of the handheld power tool, in particular fewer than six impact vibration periods of the electric motor, most preferably fewer than four impacts of an impact mechanism, in particular fewer than four impact vibration periods of the electric motor. Here, an impact of the impact mechanism should be understood as being an axial, radial, tangential and/or circumferentially directed impact of an impact mechanism striker, in particular of a hammer, on an impact mechanism body, in particular an anvil. The impact vibration period of the electric motor is correlated with the operating variable of the electric motor. An impact vibration period of the electric motor can be determined from operating variable fluctuations in the signal of the operating variable.

A further subject of the disclosure is a handheld power tool having an electric motor, a measured-value pickup for capturing an operating variable of the electric motor, and a control unit, wherein advantageously the handheld power tool is an impact driver, in particular a rotary impact driver, and the handheld power tool is designed to execute the above-described method.

Preferably, the work status to be ascertained corresponds to an impact without onward rotation of a tool receptacle of the handheld power tool.

The electric motor of the handheld power tool sets an input spindle in rotation, and an output spindle is connected to the tool receptacle. An anvil is connected to the output spindle for conjoint rotation and a hammer is connected to the input spindle such that, as a result of the rotary movement of the input spindle, it executes an intermittent movement in the axial direction of the input spindle and an intermittent rotational movement about the input spindle, wherein the hammer in this way intermittently strikes the anvil and thus emits an impact pulse and angular momentum to the anvil and thus to the output spindle. A first sensor transmits a first signal, for example for determining a motor rotational angle, to the control unit. Furthermore, a second sensor can transmit a second signal for determining a motor speed to the control unit.

Advantageously, the handheld power tool has a memory unit, in which various values can be stored.

In a further embodiment, the handheld power tool is battery-powered handheld power tool, in particular battery-powered rotary impact driver. This ensures flexible exit use, independent of the grid, of the handheld power tool.

Advantageously, the handheld power tool is an impact driver, in particular a rotary impact driver, and the work status to be ascertained is an impact of the rotary impact mechanism without onward rotation of the struck element or of the tool receptacle.

The identification of the impacts of the impact mechanism of the handheld power tool, in particular the impact vibration periods of the electric motor, can be achieved for example in that a fast fitting algorithm is used, by means of which an evaluation of the impact ascertainment within less than 100 ms, in particular less than 60 ms, very particularly less than 40 ms, can be allowed. Here, the abovementioned method according to the disclosure allows a work status to be ascertained substantially for all of the abovementioned applications and allows loose and fixed fastening elements to be screwed into the fastening carrier.

By way of the present disclosure, it is possible to largely dispense with more complicated methods of signal processing, for example filters, signal loopbacks, system models (static and adaptive) and signal tracking.

Furthermore, these methods allow even quicker identification of the impact operation and of the work status, with the result that an even quicker reaction of the tool can be brought about. This applies in particular for the number of past impacts after the starting of the impact mechanism up to the identification and also in particular operating situations, for example the start-up phase of the drive motor. In this case, it is also not necessary for restrictions of the functionality of the tool, for example reducing the maximum drive speed, to be applied. Furthermore, the functioning of the algorithm is also independent of other influencing variables, for example the setpoint speed and battery state of charge.

In principle, no further sensor systems (for example an acceleration sensor) are required, but these evaluation methods can nevertheless also be applied to signals of further sensor systems. Furthermore, in other motor concepts, which manage for example without capturing the speed, this method can also be used for other signals.

In a preferred embodiment, the handheld power tool is a battery screwdriver, a drill, an impact drill or a hammer drill, wherein a drill bit, a core bit or various bit attachments can be used as the tool. The handheld power tool according to the disclosure is in particular in the form of an impact driver, wherein, as a result of the pulsed release of the motor energy, a higher peak torque for screwing in or unscrewing a screw or a nut is generated. Transmission of electrical energy should be understood in this context as meaning in particular that the handheld power tool passes energy on to the body via a rechargeable battery and/or a power cable connection.

Moreover, depending on the chosen embodiment, the screwdriver may be designed to be flexible in terms of its direction of rotation. In this way, the proposed method can be used both for screwing in and for unscrewing a screw or a nut.

In the context of the present disclosure, “determine” is intended to include in particular measure or capture, wherein “capture” should be understood as meaning measure and store, and in addition “determine” is also intended to include possible signal processing of a measured signal.

Furthermore, “decide” should also be understood as meaning ascertain or detect, wherein a clear association is intended to be achieved. “Identify” should be understood as meaning ascertaining a partial match with a pattern, which can be allowed for example by fitting a signal to the pattern, a Fourier analysis or the like. The “partial match” should be understood as meaning that the fitting exhibits an error that is less than a predefined threshold, in particular less than 30%, very particularly less than 20%.

Further features, possible applications and advantages of the disclosure will become apparent from the following description of the exemplary embodiment of the disclosure, which is illustrated in the drawing. It should be noted here that the features described or illustrated in the figures, individually or in any desired combination, have only a descriptive character for the subject matter of the disclosure, regardless of how they are formulated and illustrated in the description and in the drawing, respectively, and are not intended to limit the disclosure in any form.

BRIEF DESCRIPTION OF THE DRAWINGS

The disclosure is explained in more detail in the following text on the basis of preferred exemplary embodiments. In the schematic drawings:

FIG. 2(*b*) shows a match of the signal, shown in FIG. 2(*a*), of the operating variable with a model signal;

FIG. 10(*b*) shows an amplitude function of a first frequency contained in the signal in FIG. 10(*a*);

FIG. 10(*c*) shows an amplitude function of a second frequency contained in the signal in FIG. 10(*a*);

DETAILED DESCRIPTION

Figure 1:
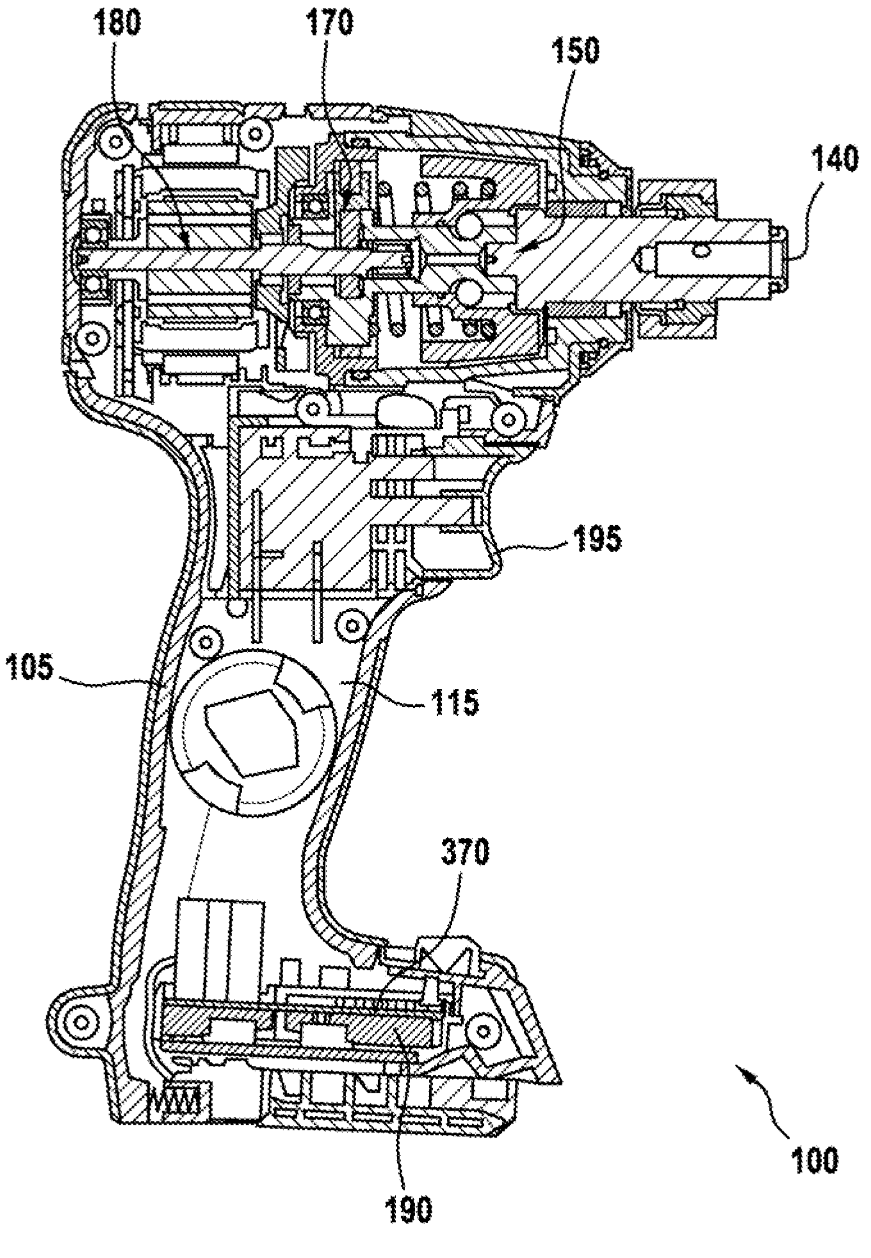
FIG. 1 shows a schematic illustration of an electric handheld power tool.

FIG. 1 shows a handheld power tool 100 according to the disclosure, which has a housing 105 with a handle 115. According to the illustrated embodiment, to be supplied with power independently of the grid, the handheld power tool 100 is connectable mechanically and electrically to a battery pack 190. In FIG. 1, the handheld power tool 100 is in the form for example of a battery-powered rotary impact driver. However, it should be noted that the present disclosure is not limited to battery-powered rotary impact drivers, but can be used in principle in handheld power tools 100 in which it is necessary to ascertain a work status, for instance impact drills.

Arranged in the housing 105 are an electric motor 180, supplied with power by the battery pack 190, and a transmission 170. The electric motor 180 is connected to an input spindle via the transmission 170. Furthermore, a control unit 370 is arranged within the housing 105 in the region of the battery pack 190, said control unit 370, for the open-loop and/or closed-loop control of the electric motor 180 and the transmission 170, acting thereon for example by means of a set motor speed n, a selected angular momentum, a desired gear x or the like.

The electric motor 180 is actuable, i.e. able to be switched on and off, for example via a manual switch 195, and may be any desired type of motor, for example an electronically commutated motor or a DC motor. In principle, the electric motor 180 is able to be subjected to electronic open-loop and/or closed-loop control such that both reversing operation and specifications with regard to the desired motor speed n and the desired angular momentum are realizable. The manner of operation and the structure of a suitable electric motor are sufficiently well known from the prior art and so will not be described in detail here in order to keep the description concise.

Via an input spindle and an output spindle, a tool receptacle 140 is mounted rotatably in the housing 105. The tool receptacle 140 serves to receive a tool and can be integrally formed directly on the output spindle or connected thereto in the form of an attachment.

The control unit 370 is connected to a power source and is configured such that it can subject the electric motor 180 to electronic open-loop and/or closed-loop control by means of various current signals. The various current signals provide for different angular momentums of the electric motor 180, wherein the current signals are passed to the electric motor 180 via a control line. The power source may be in the form for example of a battery or, as in the illustrated exemplary embodiment, in the form of a battery pack 190 or of a connection to the grid.

Furthermore, control elements (not illustrated in detail) may be provided in order to set different operating modes and/or the direction of rotation of the electric motor 180.

According to one aspect of the disclosure, a method for operating a handheld power tool 100 is provided, by means of which a work status for example of the handheld power tool 100 illustrated in FIG. 1 can be established during use, for example a screwing-in or unscrewing operation, and in which, as a consequence of this establishment, corresponding reactions or routines, initiated by the machine, are initiated. As a result, reliably reproducible, high-quality screwing-in and unscrewing operations can be achieved. Aspects of the method are based, inter alia, on an investigation of signal shapes and a determination of a degree of matching of these signal shapes, which may correspond for example to an evaluation of onward rotation of an element, for instance a screw, driven by the handheld power tool 100.

Figures 2A, 2B:
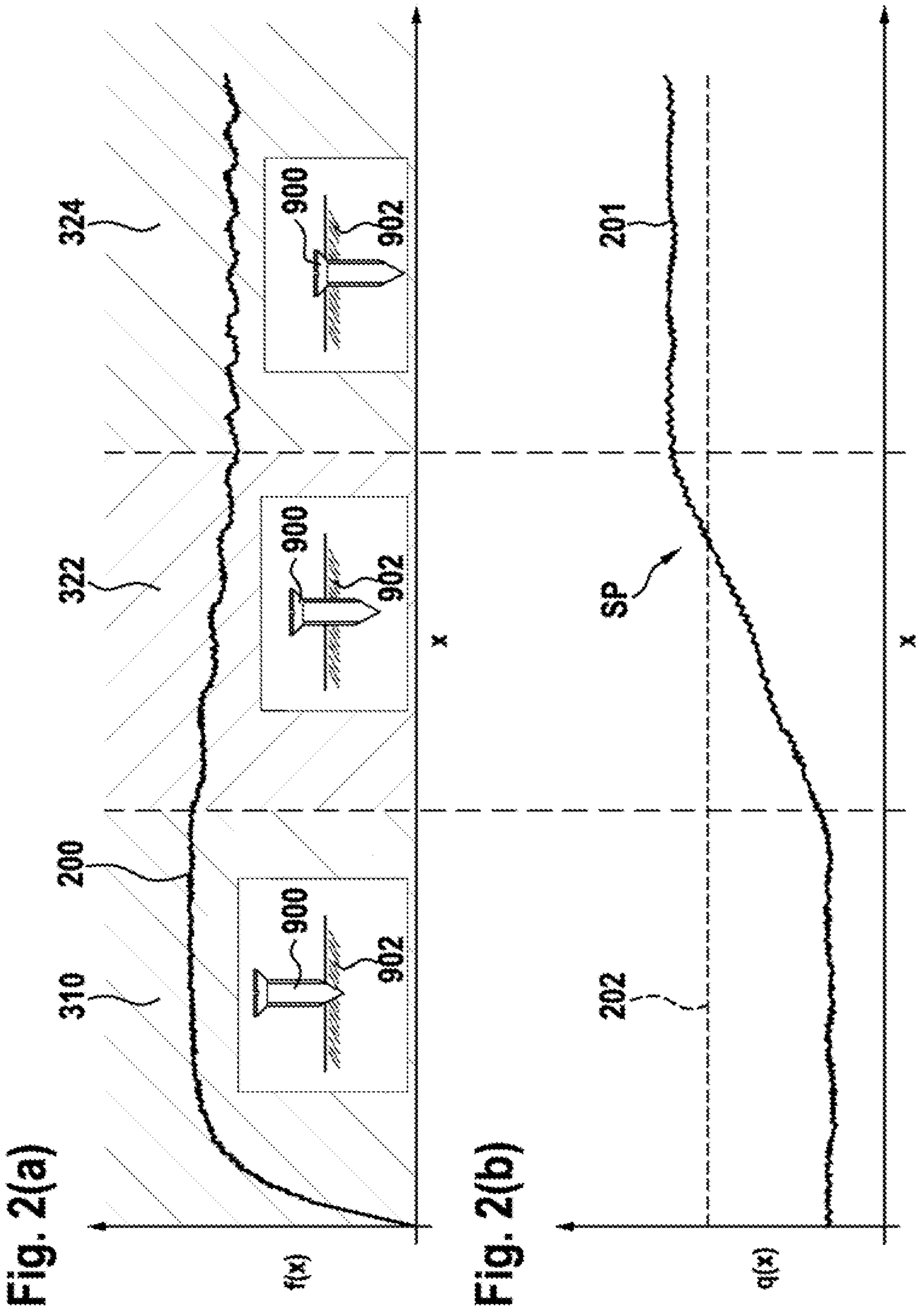
FIG. 2(*a*) shows a work status of an exemplary application and an associated signal of an operating variable.

FIG. 2 illustrates, in this regard, an example of a signal of an operating variable 200 of an electric motor 180 of a rotary impact driver, as occurs in this way or in a similar form when a rotary impact driver is used as intended. While the following statements relate to a rotary impact driver, in the context of the disclosure, they also apply, mutatis mutandis, to other handheld power tools 100, for example impact drills.

Time is plotted as reference variable on the abscissa x in the present example in FIG. 2. In an alternative embodiment, however, a variable correlated with time is plotted as reference variable, for example the rotational angle of the tool receptacle 140, the rotational angle of the electric motor 180, an acceleration, a jerk, in particular a higher order jerk, an output, or an energy. The motor speed n that applies at any time is plotted on the ordinate f(x) in the figure. Rather than the motor speed, it is also possible for some other operating variable that correlates with the motor speed to be chosen. In alternative embodiments of the disclosure, f(x) represents for example a signal of the motor current.

The motor speed and motor current are operating variables that are usually captured without additional effort by a control unit 370 in handheld power tools 100. The ascertainment of the signal of an operating variable 200 of the electric motor 180 is indicated as method step S2 in FIG. 4, which shows a schematic flow chart of a method according to the disclosure. In preferred embodiments of the disclosure, a user of the handheld power tool 100 can select the operating variable on the basis of which the method according to the disclosure is intended to be carried out.

FIG. 2(*a*) shows an application involving a loose fastening element, for example a screw 900, in a fastening carrier 302, for example a wooden board. It is apparent from FIG. 2(*a*) that the signal comprises a first region 310 which is characterized by a monotonic increase in the motor speed, and by a region with a comparatively constant motor speed, which may also be referred to as a plateau. The intersection point between the abscissa x and ordinate f(x) in FIG. 2(*a*) corresponds, during the screwdriving operation, to the starting of the rotary impact driver.

In the first region 310, the screw 900 encounters relatively little resistance in the fastening carrier 902, and the torque required for screwing it in lies beneath the disengagement torque of the rotary impact mechanism. The curve of the motor speed in the first region 310 thus corresponds to the operating state of screwdriving without impact.

As is apparent from FIG. 2(*a*), the head of the screw 900 is not in contact with the fastening carrier 902 in the region 322, meaning that the screw 900 being driven by the rotary impact driver is rotated onward with each impact. This additional rotational angle can become smaller as the work operation continues, this being reflected in the figure by a decreasing period duration. Moreover, further screwing in can also be indicated by a speed that decreases on average.

If the head of the screw 900 subsequently reaches the substrate 902, an even higher torque and thus more impact energy is required for further screwing in. Since, however, the handheld power tool 100 does not supply any more impact energy, the screw 900 no longer rotates onward or rotates onward only through a significantly smaller rotational angle.

The rotary impact operation executed in the second 322 and third region 324 is characterized by an oscillating curve of the signal of the operating variable 200, wherein the shape of the oscillation can be for example trigonometric or other oscillation. In the present case, the oscillation has a curve that can be referred to as a modified trigonometric function. This characteristic shape of the signal of the operating variable 200 in impact screwdriving operation arises on account of the priming and releasing of the impact mechanism striker and the system chain, inter alia of the transmission 170, located between the impact mechanism and electric motor 180.

The qualitative signal shape of impact operation is thus known in principle on account of the inherent properties of the rotary impact driver. In the method according to the disclosure in FIG. 4, starting from this finding, at least one state-typical model signal shape 240 is provided in a step S1, wherein the state-typical model signal shape 240 is associated with a work status, for example the achievement of contact between the head of the screw 900 and the fastening carrier 902. In other words, the state-typical model signal shape 240 contains typical features for the work status, such as the existence of a waveform, vibration frequencies or amplitudes, or individual signal sequences in a continuous, quasi-continuous or discrete form.

In other applications, the work status to be detected can be characterized by other signal shapes than by vibrations, for instance by discontinuities or growth rates in the function f(x). In such cases, the state-typical model signal shape is characterized by these very parameters rather than by vibrations.

In a preferred configuration of the method according to the disclosure, in method step S1, the state-typical model signal shape 240 can be set by a user. The state-typical model signal shape 240 can likewise be stored or saved inside the device. In an alternative embodiment, the state-typical model signal shape can alternatively and/or additionally be provided to the handheld power tool 100, for example by an external data device.

In a method step S3 of the method according to the disclosure, the signal of the operating variable 200 of the electric motor 180 is compared with the state-typical model signal shape 240. The feature "compare" should be understood to have a broad meaning in the context of the present disclosure and to be interpreted within the scope of signal analysis, such that a result of the comparison may in particular also be a partial or gradual match of the signal of the operating variable 200 of the electric motor 180 with the state-typical model signal shape 240, wherein the degree of matching of the two signals can be determined by different mathematical methods which will be described later.

In step S3, a match rating of the signal of the operating variable 200 of the electric motor 180 with the state-typical model signal shape 240 is moreover determined from the comparison and thus a statement can be made about the matching of the two signals. In this case, the execution and sensitivity of the match rating are parameters for ascertaining the work status that are settable at the factory or by the user.

FIG. 2(*b*) shows a curve of a function q(x) of a match rating 201 that corresponds to the signal of the operating variable 200 in FIG. 2(*a*) and indicates, at every point on the abscissa x, a value of the match between the signal of the operating variable 200 of the electric motor 180 and the state-typical model signal shape 240.

In the present example of the screwing in of the screw 900, this rating is used to determine the amount of onward rotation upon an impact. The state typical model signal shape 240 predetermined in step S1 corresponds in the example to an ideal impact without onward rotation, meaning the state in which the head of the screw 900 is in contact with the surface of the fastening carrier 902, as shown in the region 324 in FIG. 2(*a*). Accordingly, in region 324, there is a high match between the two signals, this being reflected by a constantly high value of the function q(x) of the match rating 201. By contrast, in the region 310, in which each impact is associated with large rotational angles of the screw 900, only small match values are achieved. The less the screw 900 rotates onward upon the impact, the higher this match is, this being discernible from the fact that the function q(x) of the match rating 201 already reproduces continuously increasing match values when the impact mechanism starts in the region 322, which is characterized by a rotational angle of the screw 200 that gets continuously smaller on each impact on account of the increasing screw-in resistance.

In a method step S4 of the method according to the disclosure, the work status is now ascertained at least partially on the basis of the match rating 201 determined in method step S3. As is apparent from the example in FIG. 2, the match rating 201 of the signals for impact differentiation is highly suitable for this purpose on account of the more or less jumpy nature thereof, wherein this jumpy change is caused by the likewise more or less jumpy change in the onward rotational angle of the screw 900 at the end of the exemplary work operation. The ascertainment of the work status can in this case take place for example at least partially on the basis of a comparison of the match rating 201 with a threshold value, which is indicated in FIG. 2(*b*) by a dashed line 202. In the present example of FIG. 2(*b*), the intersection point SP of the function q(x) of the match rating 201 with the line 202 is associated with the work status of the contact of the head of the screw 900 with the surface of the fastening carrier 902.

The criterion derived therefrom, on the basis of which the work status is determined, is settable in this case in order to make the function usable for a wide variety of applications. It should be noted here that the function is not only limited to screwing-in cases but also includes a use in unscrewing applications.

According to the disclosure, by distinguishing between signal shapes, it is possible to evaluate the onward rotation of an element driven by a rotary impact driver in order to establish the work status of an application.

In spite of the resultant reduction in the speed changing the operating state to impact operation, in the case for example of small wood screws or self-tapping screws, it is possible only with great difficulty to prevent the screw head from penetrating into the material. This is due to the fact that the impacts of the impact mechanism result in a high spindle speed, even with increasing torque.

Figure 3:
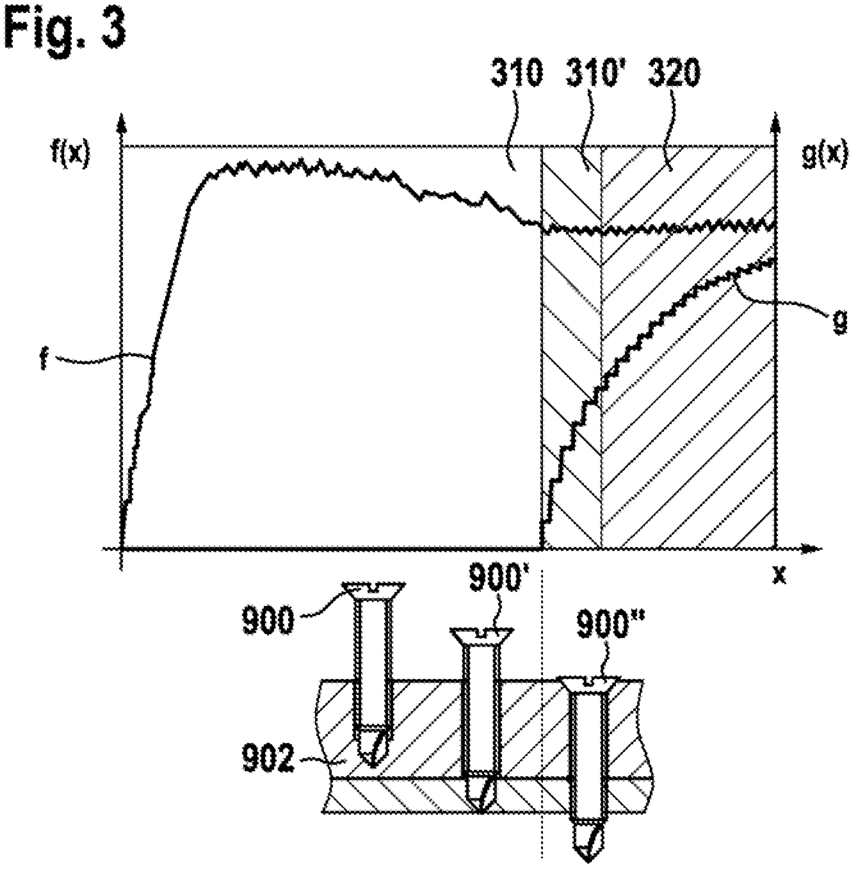
FIG. 3 shows a work status of an exemplary application and two associated signals of operating variables.

This behavior is illustrated in FIG. 3. As in FIG. 2, time for example is plotted on the abscissa x, while a motor speed is plotted on the ordinate f(x) and the torque g(x) is plotted on the ordinate g(x). The graphs f and g accordingly indicate the curves of the motor speed f and of the torque g over time. In the lower region of FIG. 3, again similarly to the illustration in FIG. 2, different states during an operation of screwing a wood screw 900, 900' and 900" into a fastening carrier 902 are schematically illustrated.

In the "no impact" operating state, which is indicated by the reference sign 310 in the figure, the screw rotates at a high speed f and low torque g. In the "impact" operating state, indicated by the reference sign 320, the torque g increases rapidly, while the speed f decreases only slightly, as already noted above. The region 310 in FIG. 3 indicates the region within which the impact ascertainment explained in connection with FIG. 2 takes place.

In order for example to prevent a screw head of the screw 900 from penetrating the fastening carrier 902, according to the disclosure, in a method step S5, an application-related, appropriate routine or reaction of the tool is executed at least partially on the basis of the work status ascertained in method step S4, for instance switching off of the machine, a change in the speed of the electric motor 180, and/or visual, audible and/or haptic feedback to the user of the handheld power tool 100.

In one embodiment of the disclosure, the first routine comprises the stopping of the electric motor 180 taking into consideration at least one defined and/or presettable parameter, in a particular a parameter that is presettable by a user of the handheld power tool.

Figure 4:
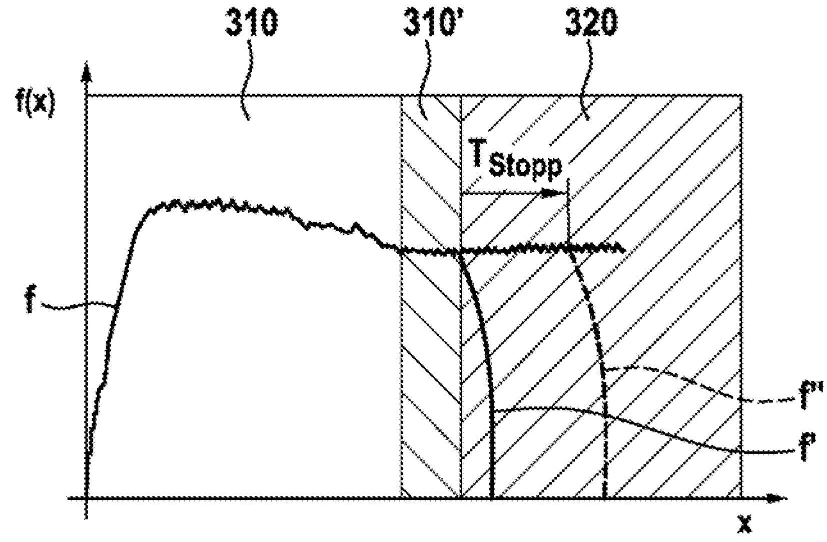
FIG. 4 shows curves of signals of an operating variable according to two embodiments of the disclosure.

As an example of this, stopping of the device immediately after the impact ascertainment 310' is schematically shown in FIG. 4, with the result that the user is assisted in preventing the screw head from penetrating into the fastening carrier 902. In the figure, this is illustrated by the branch f' of the graph f that drops rapidly after the region 310'.

An example of a defined and/or presettable parameter, in particular a parameter that is settable by a user of the handheld power tool 100, a time, defined by the user, after which the device stops, this being illustrated in FIG. 4 by the period $T_{Stopp}$ and the associated branch f" of the graph f. Ideally, the handheld power tool 100 stops just such that the screw head is flush with the screw contact surface. Since the time until this case occurs is different from application to application, however, it is advantageous for the period $T_{Stopp}$ to be definable by the user.

Figure 5:
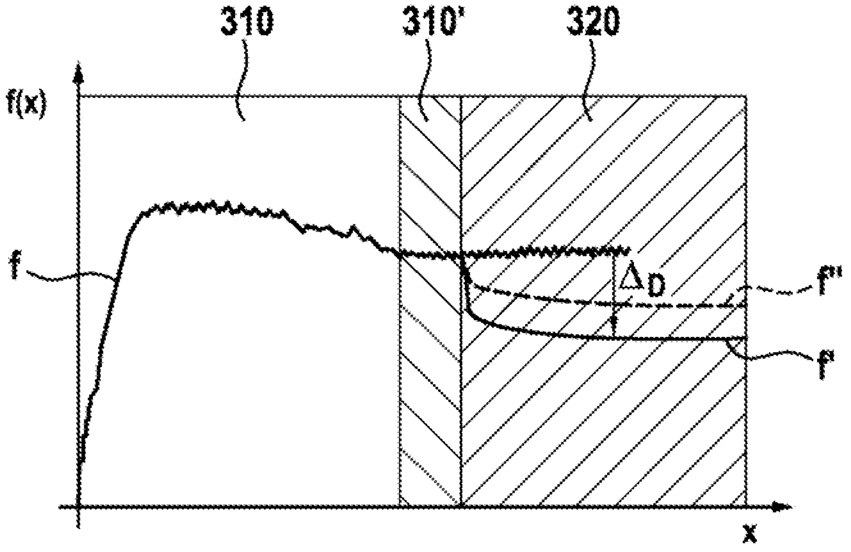
FIG. 5 shows curves of signals of an operating variable according to two embodiments of the disclosure.

Alternatively or in addition, in one embodiment of the disclosure, the first routine comprises a change, in particular a reduction and/or an increase, in a speed, in particular a setpoint speed, of the electric motor 180 and therefore also of the spindle speed after impact ascertainment. The embodiment in which a reduction in the speed is executed is illustrated in FIG. 5. Again, the handheld power tool 100 is initially operated in the "no impact" operating state 310, which is characterized by the curve, represented by the graph f, of the motor speed. After an impact has been ascertained in the region 310', the motor speed is reduced in the example by a particular amplitude, this being illustrated by the graphs f' and f", respectively.

The amplitude or the level of the change in speed of the electric motor 180, characterized by $\Delta_D$ for the branch f" of the graph f in FIG. 5, can be set by the user in one embodiment of the disclosure. As a result of the reduction in the speed, the user has more time to react when the screw head approaches the surface of the fastening carrier 902. As soon as the user is of the opinion that the screw head is flush enough with the contact surface, they can stop the handheld power tool 100 with the aid of the switch. Compared to the stopping of the handheld power tool 100 after impact ascertainment, the change in motor speed, a reduction in the example of FIG. 5, has the advantage that, as a result of switching off being determined by the user, this routine is largely independent of the application.

In one embodiment of the disclosure, the amplitude $\Delta_D$ of the change in speed of the electric motor 180 and/or a target value of the speed of the electric motor 180 is definable by a user of the handheld power tool 100, this increasing the flexibility of this routine further for the purposes of applicability for different applications.

The change in speed of the electric motor 180 takes place multiply and/or dynamically in embodiments of the disclosure. In particular provision may be made for the change in speed of the electric motor 180 to take place successively in time and/or along a characteristic curve of the change in speed, and/or depending on the work status of the handheld power tool 100.

Examples of this comprise, inter alia, combinations of a reduction in speed and an increase in speed. Moreover, different routines or combinations thereof can be executed in a time-offset manner for impact ascertainment. Furthermore, the disclosure also comprises embodiments in which there is a temporal offset between two or more routines. If, for example, the motor speed is reduced directly after impact ascertainment, the motor speed can also be increased again after a particular time value. Furthermore, embodiments are provided in which not only different routines themselves but also the time offset between the routines is preset by a characteristic curve.

Figure 6:
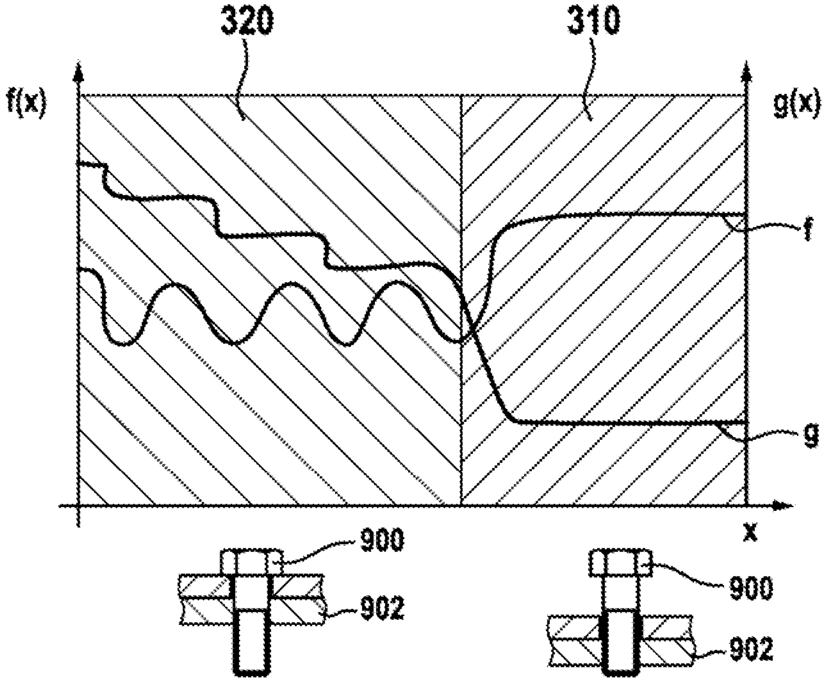
FIG. 6 shows a work status of an exemplary application and two associated signals of operating variables.

As mentioned at the beginning, the disclosure comprises embodiments in which the work status is characterized by a change from an "impact" operating state in a region 320 to the "no impact" operating state in a region 310, this being illustrated in FIG. 6.

Such a transition of the operating states of the handheld power tool is given for example in a work status in which a screw 900 is released from a fastening carrier 902, i.e. during an unscrewing operation, this being schematically illustrated in the lower region of FIG. 6. As also in FIG. 3, in FIG. 6 the graph f represents the speed of the electric motor 180 and the graph g represents the torque.

As already explained in connection with other embodiments of the disclosure, the operating state of the handheld power tool, in the present case the operating state of the impact mechanism, is also ascertained here with the aid of the discovery of characteristic signal shapes.

In the "impact" operating state, i.e. in the region 320 in FIG. 6, the screw 900 does not rotate and a high torque g is applied. In other words, the spindle speed is equal to zero in this state. In the "no impact" operating state, i.e. in the region 310 in FIG. 6, the torque g rapidly drops, this in turn providing for an equally rapid increase in the spindle and motor torque f. As a result of this rapid increase in the motor torque f, caused by the reduction in the torque g from the time at which the screw 900 is released from the fastening carrier 902, it is often difficult for a user to capture the screw 900 or nut being released and prevent it from dropping down.

Figure 7:
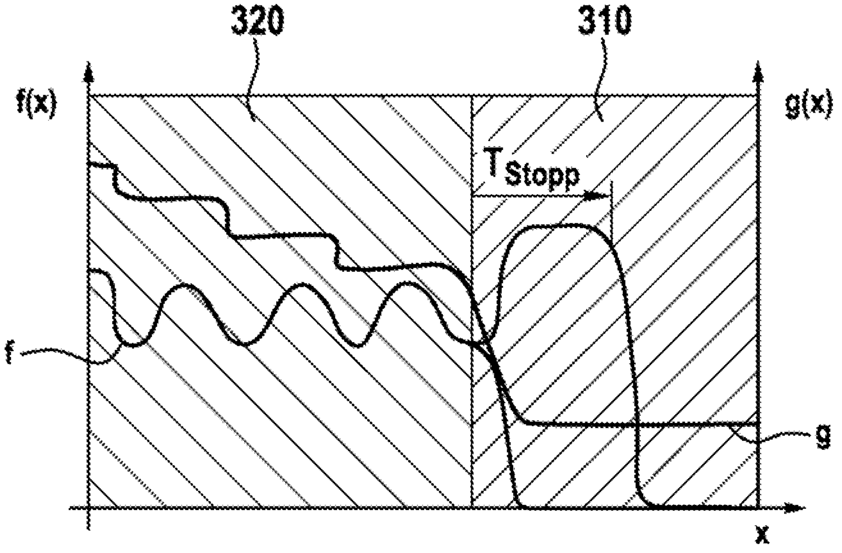
FIG. 7 shows curves of signals of two operating variables according to two embodiments of the disclosure.

The method according to the disclosure can be applied in order to prevent a threaded means, which may be a screw 900 or a nut, from being unscrewed so rapidly after being released from the fastening carrier 902 that it drops down. In this regard, reference is made to FIG. 7. FIG. 7 corresponds substantially to FIG. 6 in terms of the illustrated axes and graphs, and corresponding reference signs indicate corresponding features.

In a first embodiment, the routine in step S5 comprises the stopping of the handheld power tool 100 immediately after it has been established that the handheld power tool 100 is working in the "no impact" operating mode, this being illustrated in FIG. 7 by a steeply falling branch f' of the graph f of the motor speed in the region 310. In alternative embodiments, the user can define a time $T_{Stopp}$ after which the device stops. In the figure, this is illustrated by the branch f" of the graph f of the motor speed. A person skilled in the art recognizes that the motor speed, as also shown in FIG. 6, initially increases rapidly after the transition from the region 320 ("impact" operating state) to the region 310 ("no impact" operating state) and drops steeply after expiry of the time period $T_{Stopp}$.

Given a suitable selection of the time period $T_{Stopp}$, it is possible for the motor speed to drop to "zero" precisely when the screw 900 or the nut is still located in the thread. In this case, the user can remove the screw 900 or the nut by way of a few thread revolutions or alternatively leave it in the thread in order, for example, to open a clamp.

Figure 8:
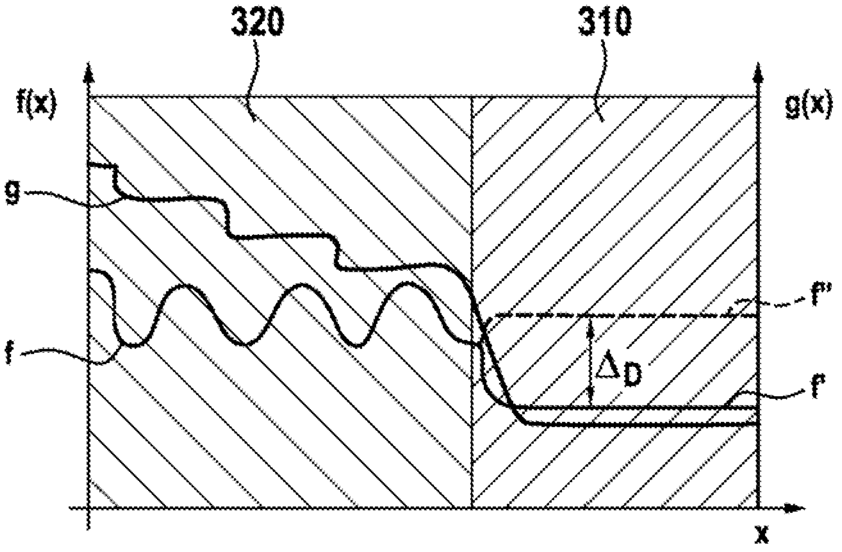
FIG. 8 shows curves of signals of two operating variables according to two embodiments of the disclosure.

A further embodiment of the disclosure is described in the following text with reference to FIG. 8. In this case, after the transition from the region 320 ("impact" operating state) to the region 310 ("no impact" operating state), a reduction in the motor speed takes place. The amplitude or amount of the reduction is specified in the figure with $\Delta_D$ as a measure between an average f" of the motor speed in the region 320 and the reduced motor speed f'. This reduction can be set by the user in certain embodiments, in particular by specifying a target value of the speed of the handheld power tool 100, which lies at the level of the branch f' in FIG. 8.

As a result of the reduction in the motor speed and thus also in the spindle speed, the user has more time to react when the head of the screw 900 is released from the screw contact surface. As soon as the user is of the opinion that the screw head or the nut has been screwed far enough, they can use the switch to stop the handheld power tool 100.

Compared with the embodiments described in connection with FIG. 7, in which the handheld power tool 100 is stopped immediately or with a delay after the transition from the region 320 ("impact" operating state) to the region 310 ("no impact" operating state), the reduction in speed has the advantage of greater independence from the application, since it is ultimately the user who determines when the handheld power tool is switched off after the reduction in speed. This can be helpful for example in the case of long threaded rods. Here, there are applications in which, after the releasing of the threaded rod and the associated stopping of the impact mechanism, a more or less long unscrewing process still needs to be carried out. Switching off the handheld power tool 100 after stopping the impact mechanism would thus not be appropriate in these cases.

In some embodiments of the disclosure, a work status is output to a user of the handheld power tool by means of an output device of the handheld power tool.

A number of technical relationships and embodiments relating to the execution of method steps S1-S4 are explained in the following text.

In practical applications, provision may be made for method steps S2 and S3 to be executed repetitively during operation of a handheld power tool 100, in order to monitor the work status of the executed application. For this purpose, in method step S2, the determined signal of the operating variable 200 may be segmented such that method steps S2 and S3 are executed on signal segments, preferably always of an identical, fixed length.

For this purpose, the signal of the operating variable 200 can be stored as a sequence of measured values in a memory, preferably a ring memory. In this embodiment, the handheld power tool 100 comprises the memory, preferably the ring memory.

As already mentioned in connection with FIG. 2, in preferred embodiments of the disclosure, in method step S2, the signal of the operating variable 200 is determined as a time series of measured values of the operating variable, or as measured values of the operating variable as a variable of the electric motor 180 that correlates with the time series. In this case, the measured values may be discrete, quasi continuous or continuous.

In one embodiment, the signal of the operating variable 200 is captured in method step S2 as a time series of measured values of the operating variable, and in a method step S2*a* following the method step S2, the time series of the measured values of the operating variable is transformed into a series of the measured values of the operating variable as a variable of the electric motor 180 that correlates with the time series, for example a rotational angle of the tool receptacle 140, the motor rotational angle, an acceleration, a jerk, in particular a higher order jerk, an output, or an energy.

Figure 9A:
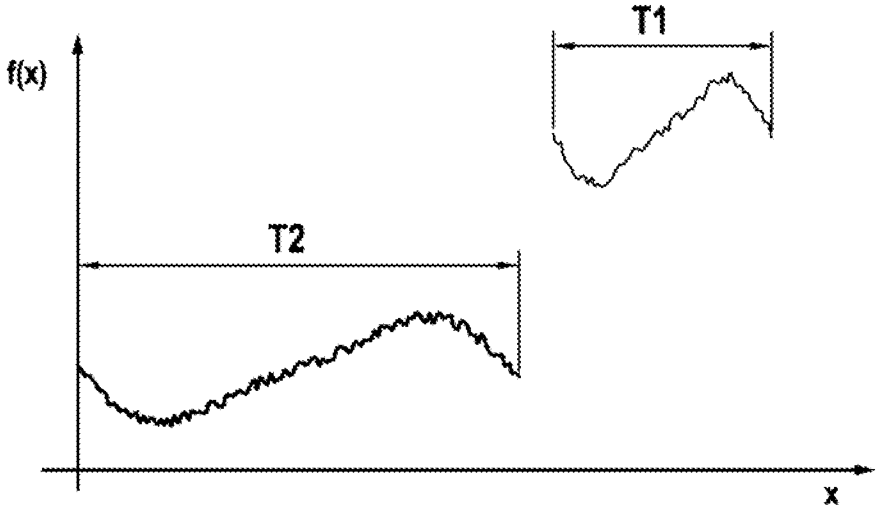
FIG. 9 shows a schematic illustration of two different recordings of the signal of the operating variable.
Figure 9B:
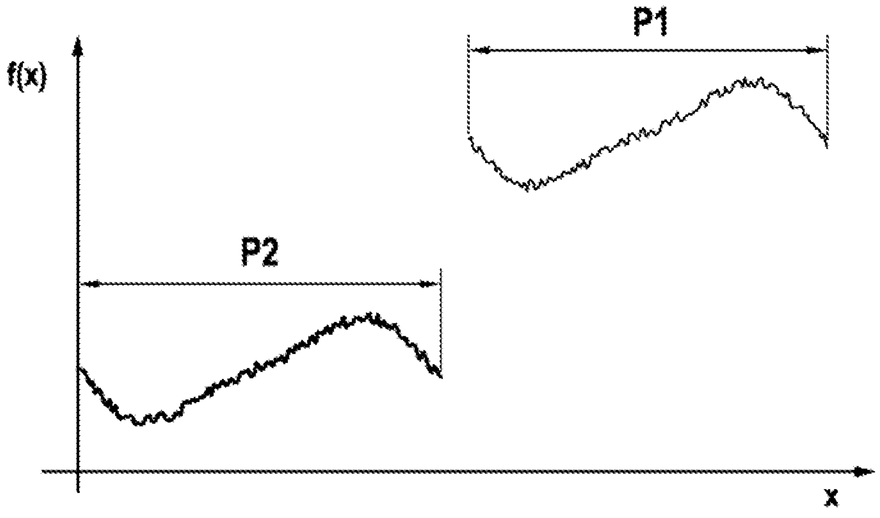

The advantages of this embodiment are described in the following text with reference to FIG. 9. Similarly to FIG. 2, FIG. 9*a* shows signals f(x) of an operating variable 200 over an abscissa x, in this case over time t. As in FIG. 2, the operating variable may be a motor speed or a parameter that correlates with the motor speed.

The depiction contains two signal curves of the operating variable 200, which can each be associated with a work status, thus for example the rotary impact screwdriving mode in the case of a rotary impact driver. In both cases, the signal comprises a wavelength of a waveform assumed to be sinusoidal under ideal conditions, wherein the signal with a shorter wavelength, T1 has a curve with a higher impact frequency, and the signal with a longer wavelength, T2 has a curve with a lower impact frequency.

Both signals can be generated with the same handheld power tool 100 at different motor speeds and are dependent, inter alia, on the speed of rotation that the user requests via the operating switch of the handheld power tool 100.

If, for example, the parameter "wavelength" is now used for the definition of the state-typical model signal shape 240, at least two different wavelengths T1 and T2 would have to be stored, in the present case, as possible parts of the state-typical model signal shape, in order that the comparison of the signal of the operating variable 200 with the state-typical model signal shape 240 results in both cases in the result of a "match". Since the motor speed can change generally and significantly over time, this means that the desired wavelength also varies and as a result the methods for ascertaining this impact frequency would accordingly have to be set adaptively.

Given a large number of possible wavelengths, the complexity of the method and of the programming would accordingly increase rapidly.

Therefore, in the preferred embodiment, the time values of the abscissa are transformed into values that correlate with the time values, for example acceleration values, higher order jerk values, output values, energy values, frequency values, rotational angle values of the tool receptacle 140 or rotational angle values of the electric motor 180. This is possible because the fixed transmission ratio of the electric motor 180 to the impact mechanism and to the tool receptacle 140 results in a direct, known dependence of the motor speed with respect to the impact frequency. As a result of this standardization, a vibration signal, independent of the motor speed, of constant periodicity is achieved, this being illustrated in FIG. 3*b* by way of the two from the transformation of the signals belonging to T1 and T2, wherein the two signals now have the same wavelength P1=P2.

Accordingly, in this embodiment of the disclosure, the state-typical model signal shape 240 can be defined, valid for all speeds, by way of a single parameter of the wavelength over the variable that correlates with time, for example the rotational angle of the tool receptacle 140, the motor rotational angle, an acceleration, a jerk, in particular a higher order jerk, an output, or an energy.

In a preferred embodiment, the comparison of the signal of the operating variable 200 in method step 33 takes place using a comparison method, wherein the comparison method comprises at least a frequency-based comparison method and/or a comparative comparison method. The comparison method compares the signal of the operating variable 200 with the state-typical model signal shape 240 to determine whether at least one predefined threshold value has been fulfilled. The comparison method compares the measured signal of the operating variable 200 with at least one predefined threshold value. The frequency-based comparison method comprises at least the bandpass filtering and/or the frequency analysis. The comparative comparison method comprises at, least the parameter estimation and/or the cross-correlation. The frequency-based comparison method and the comparative comparison method are described in more detail in the following text.

In embodiments with bandpass filtering, the input signal transformed, optionally as described, into a variable that correlates with time is filtered via one or more bandpasses, the pass bands of which match one or more state-typical model signal shapes. The pass band results from the state-typical model signal shape 240. It is also conceivable for the pass band to match a frequency stored in connection with the state-typical model signal shape 240. In the event that amplitudes of this frequency exceed a previously set limit value, as is the case upon reaching the work status to be ascertained, the comparison in method step 33 then leads to the result that the signal of the operating variable 200 is equal to the state-typical model signal shape 240 and that therefore the work status to be ascertained has been reached. The setting of an amplitude limit value can, in this embodiment, be understood as being the determination of the match rating of the state-typical model signal shape 240 with the signal of the operating variable 200, on the basis of which a decision is taken in method step S4 as to whether the work status to be ascertained exists or not.

Figures 10A, 10B, 10C:
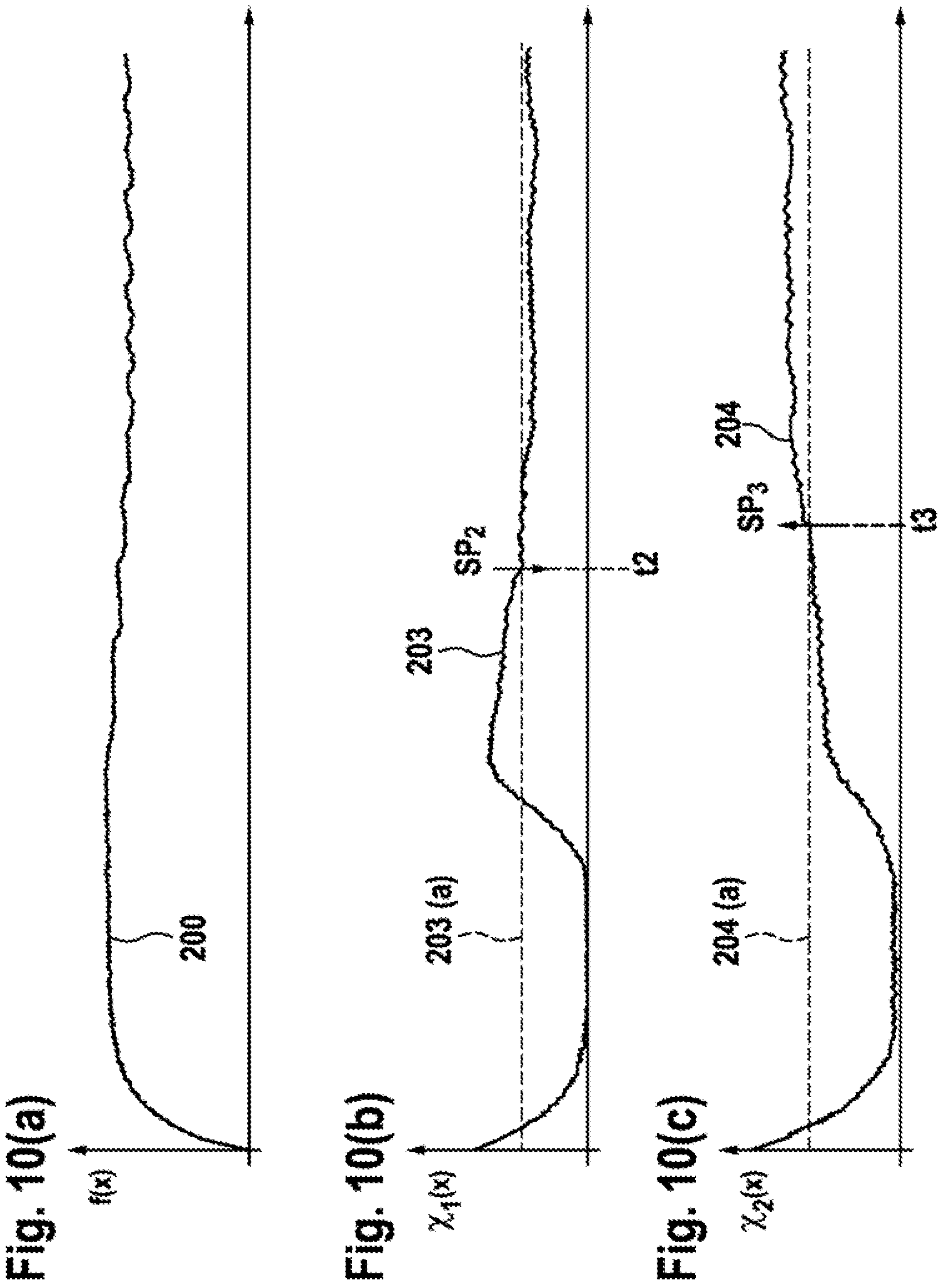
FIG. 10(*a*) shows a signal of an operating variable.

With reference to FIG. 10, the embodiment is intended to be explained in which the frequency analysis is used as frequency-based comparison method. In this case, the signal of the operating variable 200, which is illustrated in FIG. 10(*a*) and corresponds for example to the curve of the speed of the electric motor 180 over time, is transformed, on the basis of the frequency analysis, for example the fast-Fourier transformation (FFT), from a time range into the frequency range with corresponding weighting of the frequencies. In this case, the term "time range" according to the above statements should be understood as meaning both "curve of the operating variable over time" and "curve of the operating variable as a variable that correlates with time".

The frequency analysis in this form is sufficiently well known as a mathematical tool of signal analysis from many fields in the art and is used, inter alia, to approximate measured signals as series expansions of weighted periodic, harmonic functions of different wavelengths. In FIGS. 10(*b*) and 10(*c*), for example, weighting factors $\kappa_1(x)$ and $\kappa_2(x)$ indicate, as functional curves 203 and 204 over time, whether and to what extent the corresponding frequencies or frequency bands, which are not specified at this point for the sake of clarity, exist in the investigated signal, i.e. the curve of the operating variable 200.

With regard to the method according to the disclosure, it is thus possible, with the aid of the frequency analysis, to determine whether and with what amplitude the frequency associated with the state-typical model signal shape 240 exists in the signal of the operating variable 200. Furthermore, however, it is also possible for frequencies to be defined, the non-existence of which is a measure of the presence of the work status to be ascertained. As mentioned in connection with the bandpass filtering, a limit value of the amplitude can be set, which is a measure of the degree of matching of the signal of the operating variable 200 with the state-typical model signal shape 240.

In the example in FIG. 10(*b*) for instance, the amplitude $\kappa_1(x)$ of a first frequency, typically not to be found in the state-typical model signal shape 240, in the signal of the operating variable 200 drops, at the time $t_2$ (point $SP_2$), below an associated limit value 203(*a*), this being, in the example, a necessary but insufficient criterion for the presence of the work status to be ascertained. At the time $t_3$ (point $SP_3$), the amplitude $\kappa_2(x)$ of a second frequency, typically to be found in the state-typical model signal shape 240, in the signal of the operating variable 200 exceeds an associated limit value 204(*a*). In the associated embodiment of the disclosure, the common presence of the dropping below and exceeding of the limit values 203(*a*), 204(*a*) by the amplitude functions $\kappa_1(x)$ and $\kappa_2(x)$, respectively, is the decisive criterion for the match rating of the signal of the operating variable 200 with the state-typical model signal shape 240. Accordingly, in this case, it is established in method step S4 that the work status to be ascertained has been reached.

In alternative embodiments of the disclosure, only one of these criteria is used, or combinations of one of the criteria or of both criteria with other criteria, for example the reaching of a setpoint speed of the electric motor 180.

In embodiments in which the comparative comparison method is used, the signal of the operating variable 200 is compared with the state-typical model signal shape 240 in order to find out whether the measured signal of the operating variable 200 has an at least 50% match with the state-typical model signal shape 240 and thus the predefined threshold value has been reached. It is also conceivable for the signal of the operating variable 200 to be compared with the state-typical model signal shape 240 in order to determine a match of the two signals with one another.

In embodiments of the method according to the disclosure in which the parameter estimation is used as the comparative comparison method, the measured signal of the operating variables 200 is compared with the state-typical model signal shape 240, wherein parameters estimated for the state-typical model signal shape 240 are identified. With the aid of the estimated parameters, a measure of the matching of the measure signal of the operating variables 200 with the state-typical model signal shape 240 can be determined, to find out whether the work status to be ascertained has been reached. The parameter estimation is based in this case on curve fitting, which is a mathematical optimization method known to a person skilled in the art. The mathematical optimization method makes it possible, with the aid of the estimated parameters, to adapt the state-typical model signal shape 240 to a series of measurement data from the signal of the operating variable 200. Depending on the degree of matching of the state-typical model signal shape 240 parameterized by means of the estimated parameters and a limit value, the decision as to whether the work status to be ascertained has been reached can be taken.

With the aid of the curve fitting of the comparative method of parameter estimation, it is also possible to determine a degree of matching of the estimated parameters of the state-typical model signal shape 240 with respect to the measured signal of the operating variable 200.

In order to decide whether there is a sufficient match or a sufficiently small deviation of the state-typical model signal shape 240 with the estimated parameters with respect to the measured signal of the operating variable 200, in method step S3*a* following method step S3, a match determination is executed. If a 70% match of the state-typical model signal shape 240 with respect to the measured signal of the operating variable is determined, the decision can be taken as to whether the work status to be ascertained has been identified from the signal of the operating variable and whether the work status to be ascertained has been reached.

In order to decide whether there is a sufficient match of the state-typical model signal shape 240 with the signal of the operating variable 200, a quality determination for the estimated parameters is executed in a further embodiment in a method step S3*b* following method step S3. In the quality determination, values for a quality of between 0 and 1 are determined, wherein a lower value means greater confidence in the value of the identified parameter and thus represents a greater match between the state-typical model signal shape 240 and the signal of the operating variable 200. In the preferred embodiment, the decision as to whether the work status to be ascertained is present is taken, in method step S4, at least partially on the basis of the condition that the value of the quality lies in the region of 50%.

In one embodiment of the method according to the disclosure, the cross-correlation method is used as comparative comparison method in method step S3. Like the mathematical methods described above, the cross-correlation method is known per se to a person skilled in the art. In the cross-correlation method, the state-signal model signal shape 240 is correlated with the measured signal of the operating variable 200.

Compared with the method, set out above, of parameter estimation, this result of the cross-correlation is again a signal sequence with a signal length added up from a length of the signal of the operating variable 200 and the state-typical model signal shape 240, which represents the similarity of the time-shifted input signals. In this case, the maximum of this output sequence represents the time of the greatest match of the two signals, i.e. of the signal of the operating variable 200 and the state-typical model signal shape 240, and is therefore also a measure for the correlation itself, which is used, in this embodiment, in method step S4, as a decision criterion for the reaching of the work status to be ascertained. In the implementation in the method according to the disclosure, a significant difference from the parameter estimation is that any desired state-typical model signal shapes can be used for the cross-correlation, while, in the parameter estimation, the state-typical model signal shape 240 has to be able to be represented by parameterizable mathematical functions.

Figure 11A:
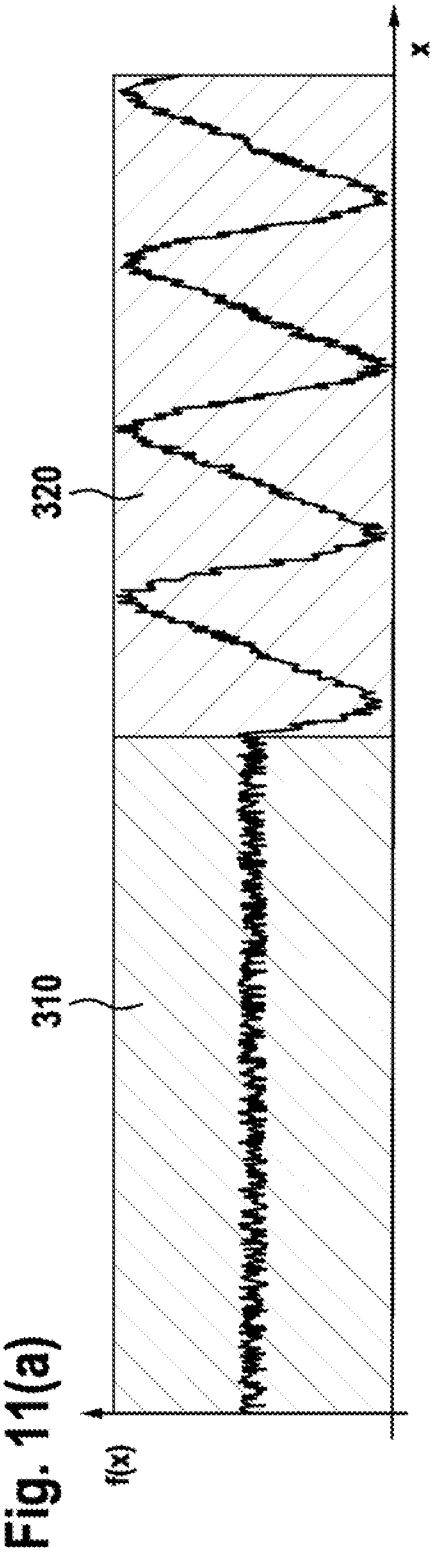
FIG. 11 shows a joint illustration of a signal of an operating variable and an output signal of bandpass filtering, based on a model signal.
Figure 11B:
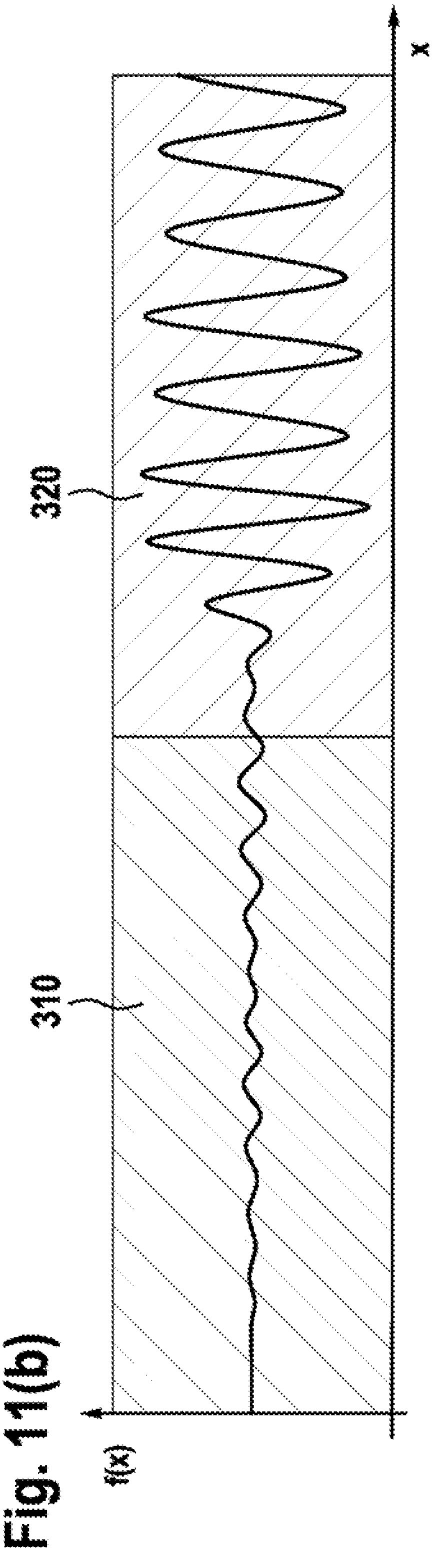
Figure 12A:
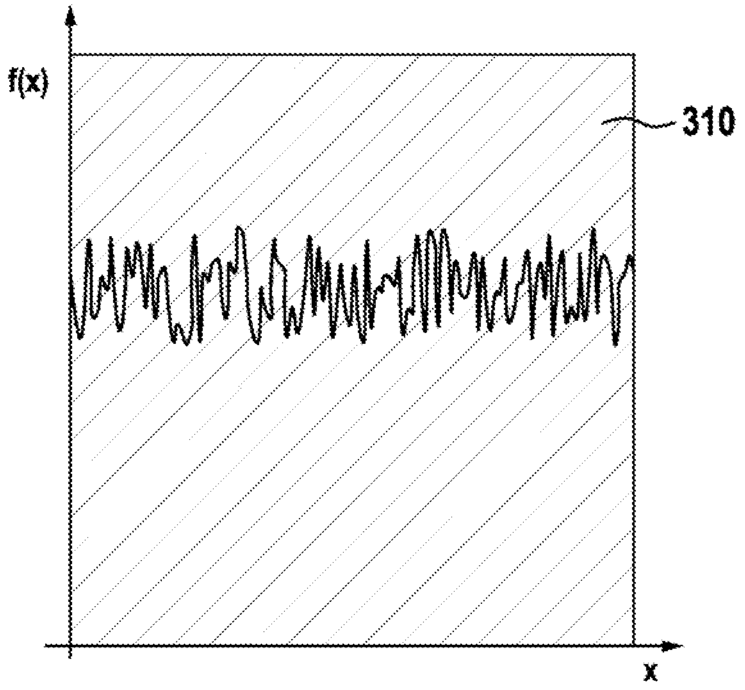
FIG. 12 shows a joint illustration of a signal of an operating variable and an output of a frequency analysis, based on a model signal.
Figure 12B:
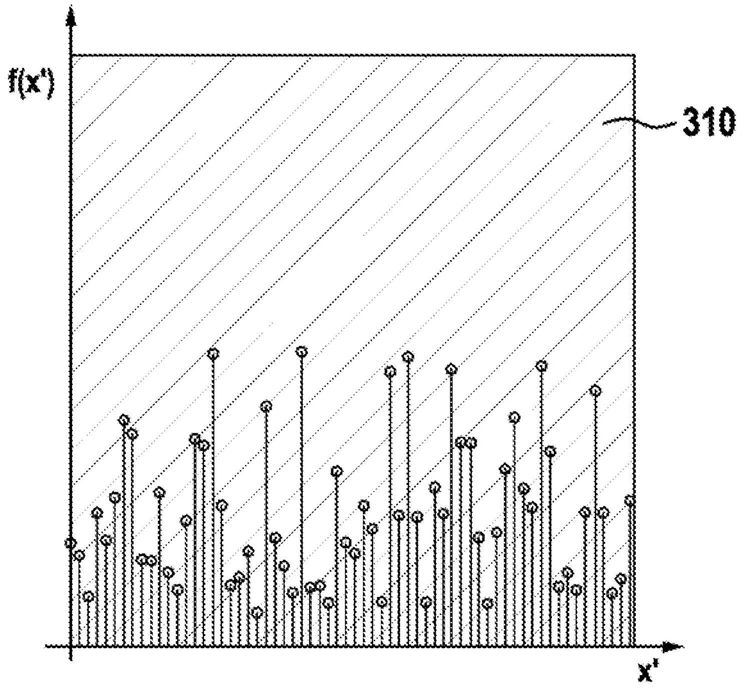
Figure 12C:
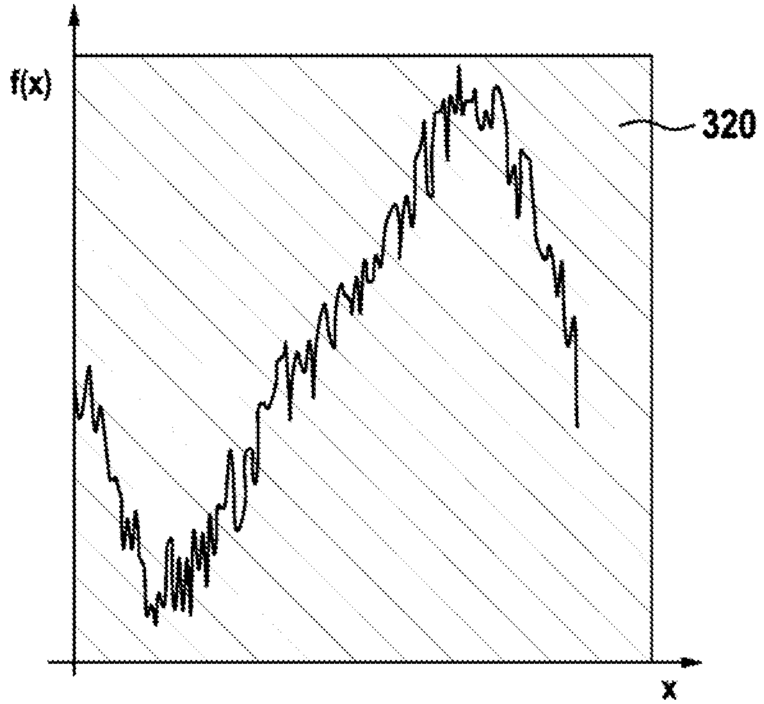
Figure 12D:
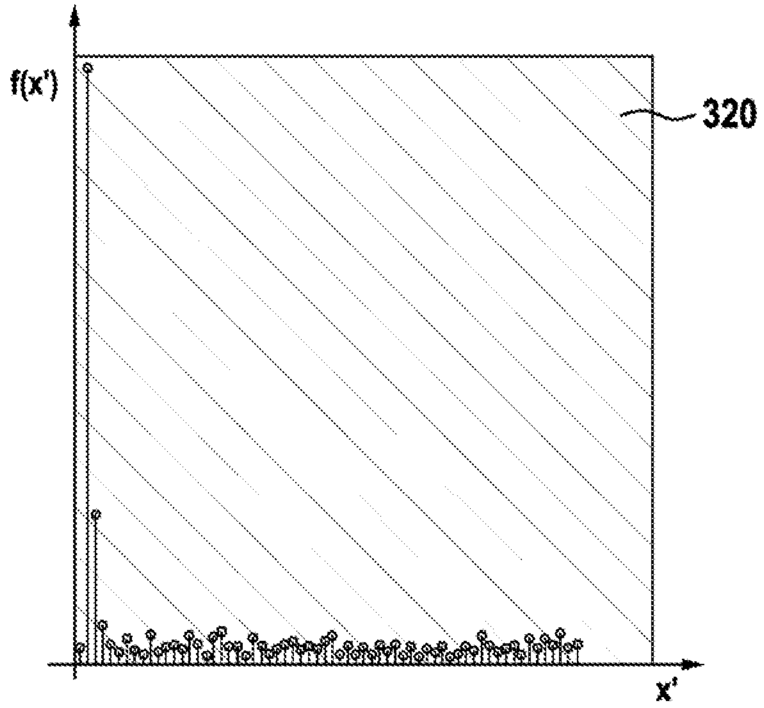

FIG. 11 shows the measured signal of the operating variable 200 for the case in which bandpass filtering is used as the frequency-based comparison method. In this case, as the abscissa x, the time or a variable that correlates with time is plotted. FIG. 11*a* shows the measured signal of the operating variable, as an input signal of the bandpass filtering, wherein, in the first region 310, the handheld power tool 100 is operated in screwdriving operation. In the second region 320, the handheld power tool 100 is operated in rotary impact operation. FIG. 11*b* illustrates the output signal after the bandpass has filtered in the input signal.

FIG. 12 illustrates the measured signal of the operating variable 200 for the case in which frequency analysis is used as the frequency-based comparison method. In FIGS. 12*a* and *b*, the first region 310 is shown, in which the handheld power tool 100 is in screwdriving operation. The time t or a variable that is correlated with time is plotted on the abscissa x in FIG. 6*a*. In FIG. 12*b*, the signal of the operating variable 200 is illustrated in a transformed form, wherein it is possible to transform for example by means of a fast-Fourier transformation from a time range into a frequency range. Plotted on the abscissa x' in FIG. 12*b* is for example the frequency f, such that the amplitudes of the signal of the operating variable 200 are illustrated. In FIGS. 12*c* and *d*, the second region 320 is illustrated, in which the handheld power tool 100 is in rotary impact operation. FIG. 12*c* shows the measured signal of the operating variable 200 plotted over time in rotary impact operation. FIG. 12*d* shows the transformed signal of the operating variable 200, wherein the signal of the operating variable 200 is plotted over the frequency f as abscissa x'. FIG. 12*d* shows characteristic amplitudes for rotary impact operation.

Figure 13A:
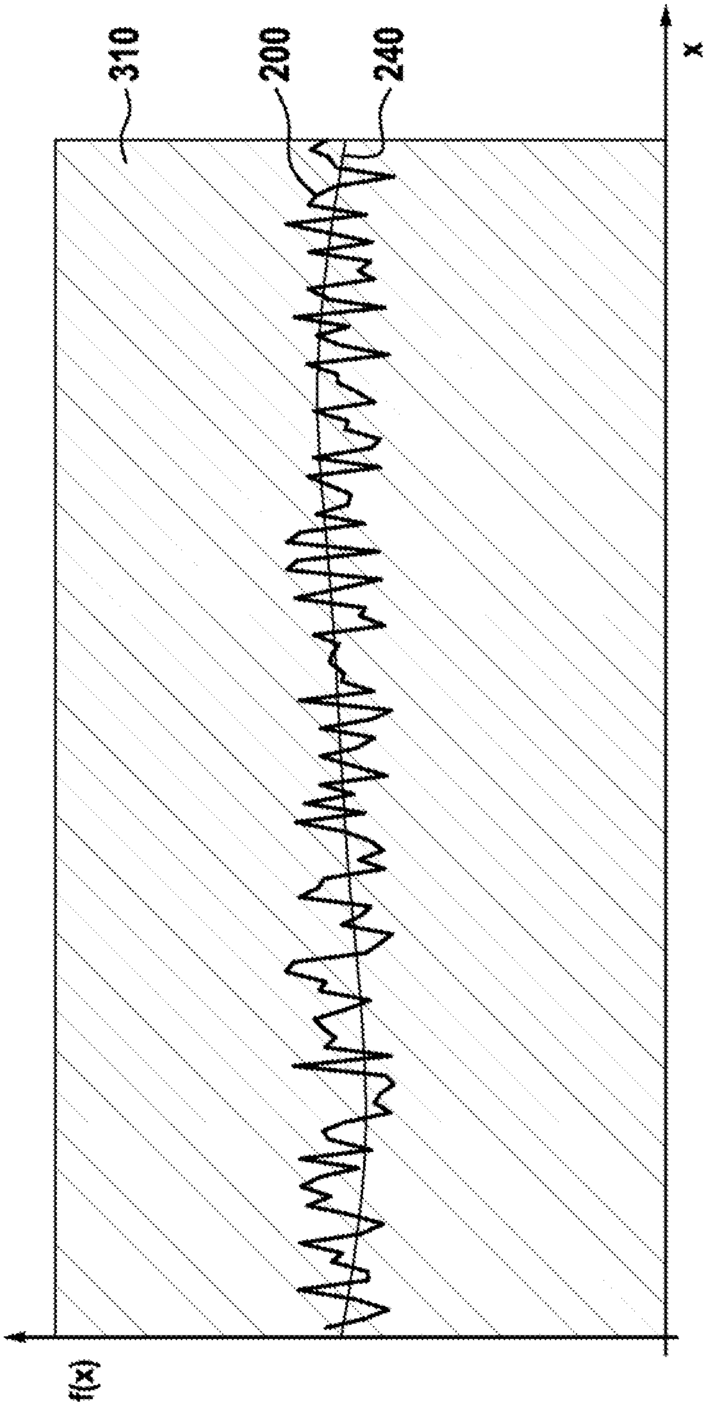
FIG. 13 shows a joint illustration of a signal of an operating variable and of a model signal for the parameter estimation.

FIG. 13*a* shows a typical case of a comparison by means of the comparative comparison method of parameter estimation between the signal of an operating variable 200 and a state-typical model signal shape 240 in the first region 310 described in FIG. 2. While the state-typical model signal shape 240 has a substantially trigonometric curve, the signal of the operating variable 200 has a curve that differs greatly therefrom. Independently of the selection of one of the above-described comparison methods, the comparison, carried out in method step S3, between the state-typical model signal shape 240 and the signal of the operating variable 200 has in this case the result that the degree of matching of the two signals is so low that, in method step S4, the work status to be ascertained is not ascertained.

Figure 13B:
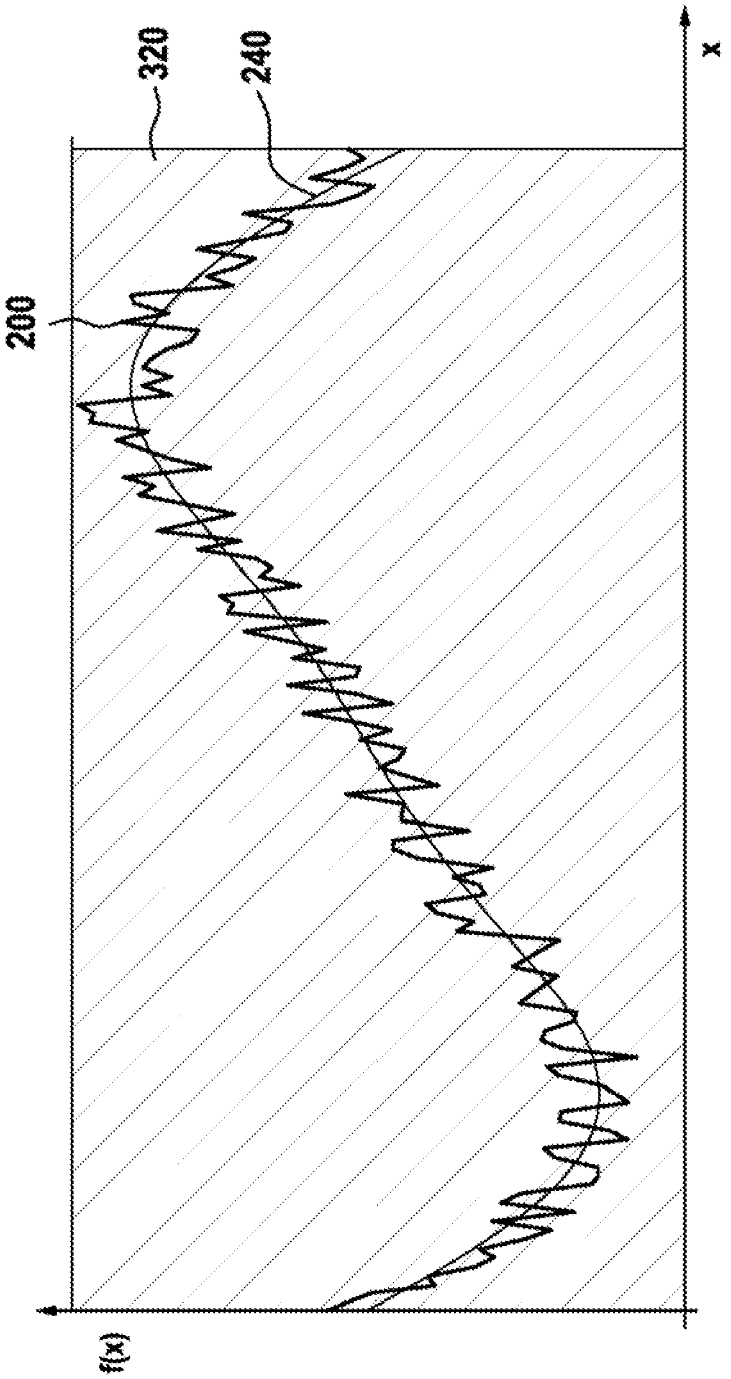

FIG. 13*b*, by contrast, illustrates the case in which the work status to be ascertained is present and therefore the state-typical model signal shape 240 and the signal of the operating variable 200 have overall a high degree of matching, even if deviations are able to be found at individual measuring points. Thus, in the comparative comparison method of parameter estimation, the decision can be taken as to whether the work status to be ascertained has been reached.

Figure 14A:
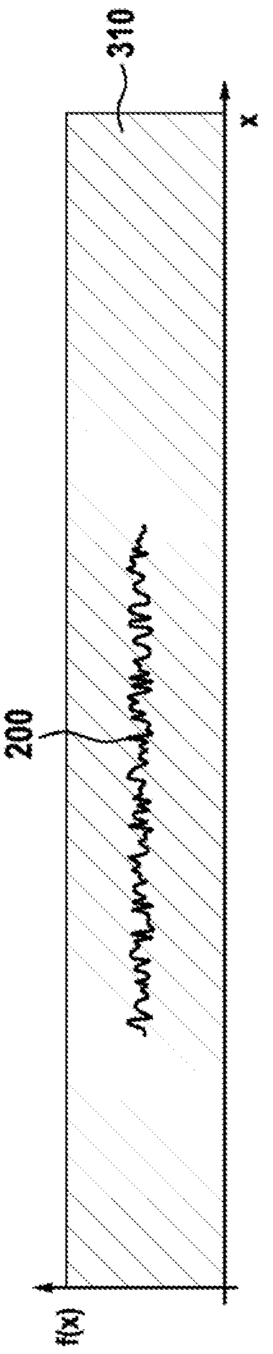
FIG. 14 shows a joint illustration of a signal of an operating variable and of a model signal for cross-correlation.
Figure 14B:
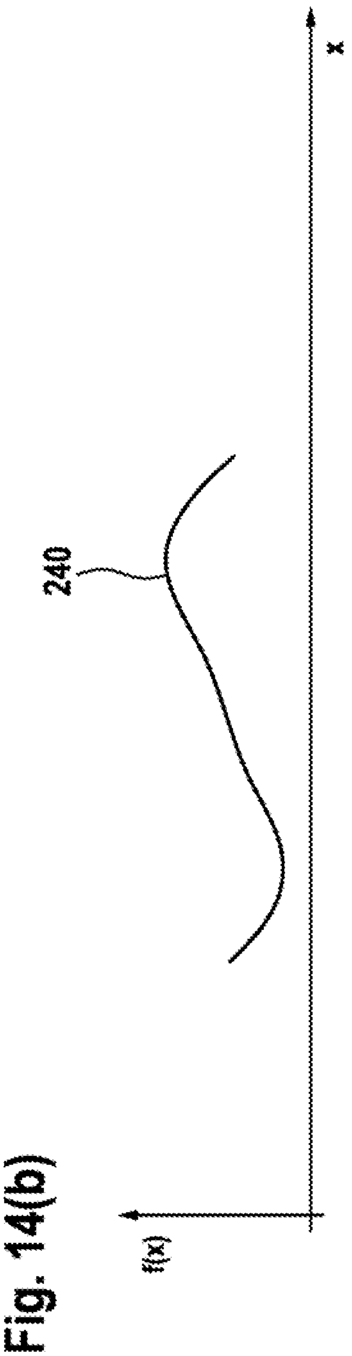
Figure 14C:
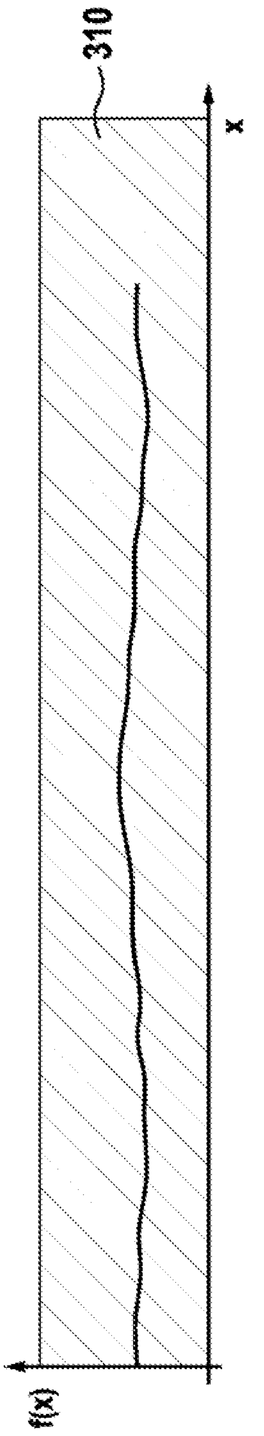
Figure 14D:
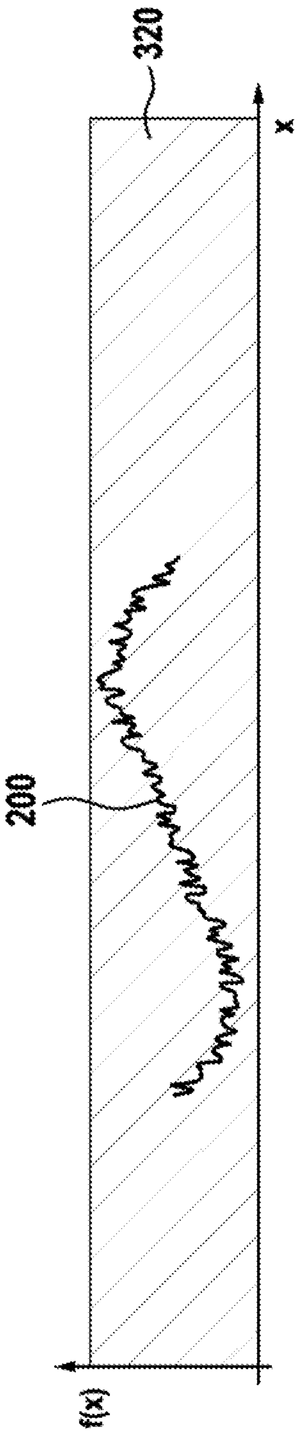
Figure 14E:
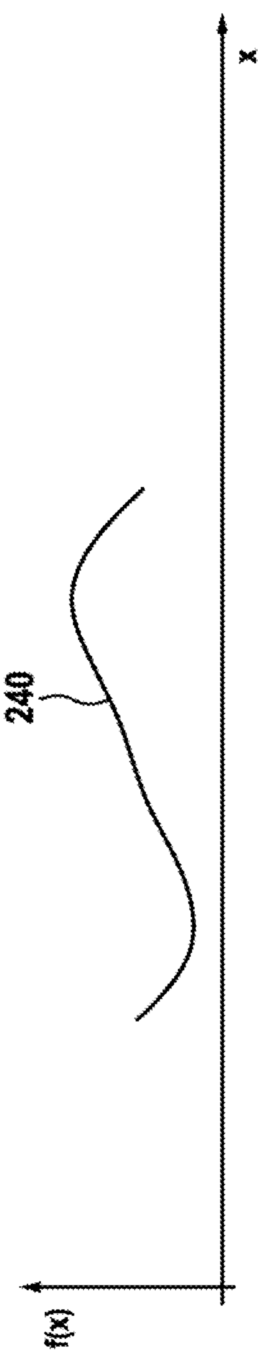
Figure 14F:
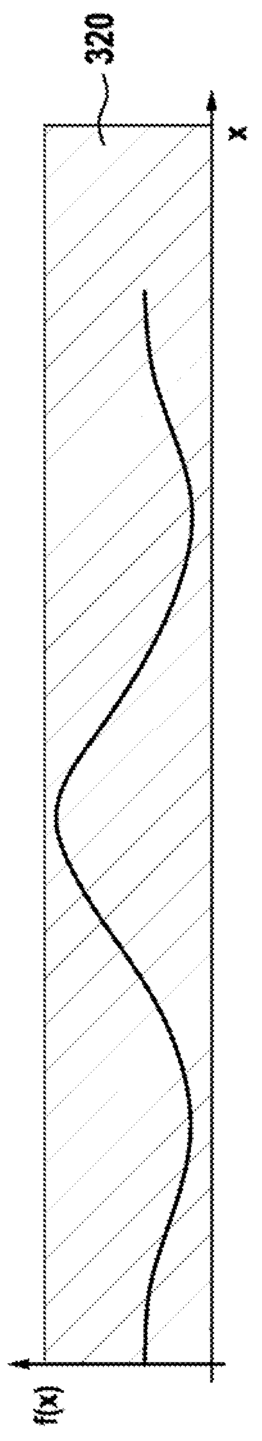

FIG. 14 shows the comparison of the state-typical model signal shape 240, see FIGS. 14*b* and 14*e*, with the measured signal of the operating variable 200, see FIGS. 14*a* and 14*d*, for the case in which cross-correlation is used as comparative comparison method. In FIGS. 14*a-f*, the time or a variable that correlates with time is plotted on the abscissa x. In FIGS. 14*a-c*, the first region 310, corresponding to screwdriving operation, is shown. In FIGS. 14*d-f*, the third region 324, corresponding to the work status to be ascertained, is shown. As described above, the measured signal of the operating variable, FIG. 14*a* and FIG. 14*d*, is correlated with the state-typical model signal shape, FIGS. 14*b* and 14*e*, in FIGS. 14*c* and 14*f*, respective results of the correlations are illustrated. In FIG. 14*c*, the result of the correlation during the first region 310 is shown, wherein it is apparent that there is a low match between the two signals. In the example in FIG. 14*c*, therefore, the decision is taken in method step S4 that the work status to be ascertained has not been reached. In FIG. 14*f*, the result of the correlation during the third region 324 is shown. It is apparent from FIG. 14*f* that there is a high match, and so the decision is taken in method step S4 that the work status to be ascertained has been reached.

The disclosure is not limited to the exemplary embodiment described and illustrated. Rather, it encompasses all developments that a person skilled in the art might make in the scope of the disclosure.

In addition to the embodiments described and depicted, further embodiments are conceivable, which may encompass further modifications and combinations of features.

The invention claimed is:

1. A method for operating a handheld power tool having an electric motor, the method comprising:

providing at least one model signal shape that is associated with a work status of the handheld power tool, the at least one model signal shape being a waveform;

determining at least one frequency of the waveform of the at least one model signal shape;

determining a signal of an operating variable of the electric motor;

determining at least one frequency of the signal of the operating variable;

determining a match rating based on a comparison of the signal of the operating variable with the at least one model signal shape;

ascertaining the work status at least partially based on the match rating; and executing a first routine of the handheld power tool at least partially based on the ascertained work status, wherein determining the match rating comprises comparing the signal of the operating variable using a comparison method to determine whether at least one threshold value of a match has been fulfilled, and wherein the comparison method is a frequency-based comparison method that compares the at least one frequency of the signal of the operating variable to the at least one frequency of the waveform of the at least one model signal shape.

2. The method as claimed in claim 1, wherein the first routine comprises:

stopping the electric motor after a predetermined time period.

3. The method as claimed in claim 1, wherein the first routine comprises:

changing a speed of the electric motor.

4. The method as claimed in claim 2, wherein a duration of the predetermined time period is defined by a user of the handheld power tool.

5. The method as claimed in claim 3, wherein the changing the speed of the electric motor takes place at least one of (i) multiple times and (ii) dynamically.

6. The method as claimed in claim 1, further comprising:

outputting the work status of the handheld power tool to a user using an output device of the handheld power tool.

7. The method as claimed in claim 1, wherein at least one of the first routine and characteristic parameters of the first routine are at least one of set by and presented to a user via at least one of an application program and a user interface.

8. The method as claimed in claim 1, wherein the operating variable is one of (i) a speed of the electric motor and (ii) an operating variable that correlates with the speed.

9. The method as claimed in claim 1, the determining the signal of the operating variable of the electric motor further comprising:

capturing the signal of the operating variable as one of (i) a time series of measured values of the operating variable and (ii) measured values of the operating value as a variable of the electric motor that correlates with the time series.

10. The method as claimed in claim 1, the determining the signal of the operating variable of the electric motor further comprising:

capturing the signal of the operating variable as a time series of measured values of the operating variable; and transforming the time series of the measured values of the operating variable into a series of the measured values of the operating variable as a variable of the electric motor that correlates with the time series.

11. The method as claimed in claim 1, wherein the handheld power tool is an impact driver and an operating state of the handheld power tool is one of starting and stopping an impact operation.

12. The method as claimed in claim 2, wherein the at least one parameter is preset by a user of the handheld power tool.

13. The method as claimed in claim 3, the changing the speed of the electric motor further comprising:

at least one of reducing and increasing the speed of the electric motor.

14. The method as claimed in claim 5, wherein the changing the speed of the electric motor takes place at least one of (i) successively in time, (ii) along a characteristic curve of the changing of the speed, and (iii) depending on the work status of the handheld power tool.

15. The method as claimed in claim 1, wherein the at least one model signal shape is a substantially trigonometric waveform.

16. The method as claimed in claim 11, wherein the handheld power tool is a rotary impact driver and an operating state of the handheld power tool is one of starting and stopping a rotary impact operation.

17. The method as claimed in claim 1, wherein the match rating is the output of a function.

18. The method as claimed in claim 1, wherein determining the match rating further comprises:

determining a first amplitude of a first frequency of the signal of the operating variable over time; and comparing the first amplitude to a first associated limit value.

19. The method as claimed in claim 18, wherein:

determining the match rating further comprises:

determining a second amplitude of a second frequency of the signal of the operating variable over time; and comparing the second amplitude to a second associated limit value; and ascertaining the work status when the match rating indicates that (i) the first amplitude is less than the first associated limit value, and (ii) the second amplitude is greater than the second associated limit value.

20. A handheld power tool comprising:

an electric motor;

a measured-value pickup configured to capture an operating variable of the electric motor; and a control unit configured to:

provide at least one model signal shape that is associated with a work status of the handheld power tool, the at least one model signal shape being a waveform;

determine at least one frequency of the waveform of the at least one model signal shape;

determine a signal of the operating variable of the electric motor;

determine at least one frequency of the signal of the operating variable;

determine a match rating based on a comparison of the signal of the operating variable with the at least one model signal shape;

ascertain the work status at least partially based on the match rating; and execute a first routine of the handheld power tool at least partially based on the ascertained work status, wherein determining the match rating comprises comparing the signal of the operating variable using a comparison method to determine whether at least one threshold value of a match has been fulfilled, and wherein the comparison method is a frequency-based comparison method that compares the at least one frequency of the signal of the operating variable to the at least one frequency of the waveform of the at least one model signal shape.

* * * * *